United States Patent
Chung et al.

(10) Patent No.: US 11,449,169 B2
(45) Date of Patent: Sep. 20, 2022

(54) METHOD FOR PROCESSING A TOUCH INPUT IN AN ELECTRONIC DEVICE HAVING MULTIPLE DISPLAYS AND AN ELECTRONIC DEVICE HAVING MULTIPLE DISPLAYS CAPABLE OF EXECUTING THE METHOD

(71) Applicant: Samsung Electronics Co., Ltd., Gyeonggi-do (KR)

(72) Inventors: Bohwa Chung, Gyeonggi-do (KR); Kwanhee Jeong, Gyeonggi-do (KR); Byoungho Jung, Gyeonggi-do (KR); Deokyang Jin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/964,486

(22) PCT Filed: Feb. 14, 2019

(86) PCT No.: PCT/KR2019/001812
§ 371 (c)(1),
(2) Date: Jul. 23, 2020

(87) PCT Pub. No.: WO2019/160347
PCT Pub. Date: Aug. 22, 2019

(65) Prior Publication Data
US 2020/0401263 A1 Dec. 24, 2020

(30) Foreign Application Priority Data

Feb. 14, 2018 (KR) .................. 10-2018-0018473

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1616* (2013.01); *G06F 1/1647* (2013.01);
(Continued)

(58) Field of Classification Search
CPC .... G06F 1/1616; G06F 1/1677; G06F 1/1692; G06F 1/1647; G06F 3/0488; G06F 3/0416; G06F 3/147; G06F 2203/04104
See application file for complete search history.

(56) References Cited

U.S. PATENT DOCUMENTS 9,318,070 B2 4/2016 Park et al.
9,377,892 B2 6/2016 Kim et al.
(Continued)

FOREIGN PATENT DOCUMENTS

KR 1020110090614 8/2011
KR 1020120075685 7/2012
(Continued)

OTHER PUBLICATIONS

PCT/ISA/210 Search Report issued on PCT/KR2019/001812, dated Jun. 4, 2019, pp. 5.
(Continued)

*Primary Examiner* — Yaron Cohen
(74) *Attorney, Agent, or Firm* — The Farrell Law Firm, P.C.

(57) ABSTRACT

An electronic device includes a first touch screen display, a second touch screen display, a processor, and a memory. The memory stores therein instructions which are executed by the processor to cause the processor to convert first data and second data related to touch inputs to the first touch screen display and the second touch screen display to first virtual data and second virtual data, respectively, based on a third coordinate region, and apply an action corresponding to a first touch input and a second touch input to the first touch
(Continued)

screen display and the second touch screen display, respectively, based on the first virtual data and second virtual data. In addition, various embodiments may be realized based on a specification.

14 Claims, 14 Drawing Sheets

(51) Int. Cl.
  *G06F 3/0488* (2022.01)
  *G06F 3/147* (2006.01)
(52) U.S. Cl.
  CPC .......... *G06F 1/1677* (2013.01); *G06F 3/0488* (2013.01); *G06F 3/147* (2013.01); *G06F 2203/04104* (2013.01)

(56) References Cited

U.S. PATENT DOCUMENTS

| | | |
|---|---|---|
| 10,013,226 B2 | 7/2018 | Sirpal et al. |
| 10,089,054 B2 | 10/2018 | Jouin |
| 2011/0187662 A1 | 8/2011 | Lee et al. |
| 2013/0076591 A1 | 3/2013 | Sirpal et al. |
| 2014/0152576 A1 | 6/2014 | Kim et al. |
| 2014/0375596 A1 | 12/2014 | Kim et al. |
| 2015/0103014 A1 | 4/2015 | Kim et al. |
| 2016/0162241 A1* | 6/2016 | An .................... H04M 1/0214 345/1.3 |
| 2016/0282964 A9 | 9/2016 | Kim et al. |
| 2016/0313962 A1* | 10/2016 | Kwon ................ G06F 3/04886 |
| 2017/0357473 A1 | 12/2017 | Kim |
| 2018/0366813 A1 | 12/2018 | Kim et al. |
| 2020/0278822 A1 | 9/2020 | Kwon et al. |

FOREIGN PATENT DOCUMENTS

| | | |
|---|---|---|
| KR | 1020140031679 | 3/2014 |
| KR | 1020160031305 | 3/2016 |
| KR | 1020160066873 | 6/2016 |
| KR | 1020160125783 | 11/2016 |
| KR | 1020170066944 | 6/2017 |
| KR | 1020170138869 | 12/2017 |

OTHER PUBLICATIONS

PCT/ISA/237 Written Opinion issued on PCT/KR2019/001812, dated Jun. 4, 2019, pp. 4.
European Search Report dated Mar. 1, 2021 issued in counterpart application No. 19755000.7-1231, 13 pages.
European Search Report dated Apr. 8, 2022 issued in counterpart application No. 19755000.7-1224, 10 pages.
Korean Office Action dated Aug. 8, 2022 issued in counterpart application No. 10-2018-0018473, 18 pages.

* cited by examiner

METHOD FOR PROCESSING A TOUCH INPUT IN AN ELECTRONIC DEVICE HAVING MULTIPLE DISPLAYS AND AN ELECTRONIC DEVICE HAVING MULTIPLE DISPLAYS CAPABLE OF EXECUTING THE METHOD

PRIORITY

This application is a National Phase Entry of PCT International Application No. PCT/KR2019/001812 which was filed on Feb. 14, 2019, and claims priority to Korean Patent Application No. 10-2018-0018473, which was filed on Feb. 14, 2018, the content of each of which is incorporated herein by reference.

TECHNICAL FIELD

Embodiments disclosed in the disclosure are related to touch input processing.

BACKGROUND ART

Recently, an electronic device including a plurality of touch screen displays has been actively spread. The electronic device including the plurality of touch screen displays may support outputting different screens (or images) on the touch screen displays, respectively. For example, the electronic device may output execution screens of different applications on the touch screen displays, respectively. Further, the electronic device including the plurality of touch screen displays may support a function that the plurality of touch screen displays act as a single touch screen display. For example, the electronic device may divide an execution screen of one application into a plurality of regions, and may display execution screens corresponding to the divided regions on the touch screen displays, respectively.

DISCLOSURE

Technical Problem

However, in a conventional electronic device, when the plurality of touch screen displays act as a single touch screen display, touch inputs to the touch screen displays respectively are independently processed by touch panels included in the touch screen displays, respectively. Thus, the plurality of touch inputs to different touch screen displays respectively may not be processed as the touch inputs to a single touch screen display. For example, a first touch input to a first touch screen display and a second touch input to a second touch screen display may not be processed as multi-touch inputs to a single touch screen display.

Embodiments disclosed in the disclosure may provide a touch input processing method capable of processing a plurality of touch inputs to different touch screen displays as the plurality of touch inputs to a single touch screen display, and an electronic device for supporting the method.

Technical Solution

An electronic device according to one embodiment disclosed in the disclosure includes a first touch screen display including a first touch panel having a first coordinate region defined using a first horizontal axis and a first vertical axis, a second touch screen display including a second touch panel having a second coordinate region defined using a second horizontal axis and a second vertical axis, a processor operatively connected to the first touch screen display and the second touch screen display, and a memory operatively connected to the processor, wherein the memory stores therein instructions which are executed by the processor to cause the processor to configure a virtual third coordinate region defined using a third horizontal axis and a third vertical axis, receive first data from the first touch panel, wherein the first data is associated with a first touch input received through the first touch screen display, and is based on the first coordinate region, receive second data from the second touch panel, wherein the second data is associated with a second touch input received through the second touch screen display and is based on the second coordinate region, convert the first data and the second data to first virtual data and second virtual data using the virtual third coordinate region, respectively, and apply an action corresponding to the first touch input and the second touch input to the first touch screen display and the second touch screen display, based on the first virtual data and the second virtual data.

Further, an electronic device according to one embodiment disclosed in the disclosure includes a first touch screen display including a first display panel for displaying a first screen based on a first display buffer corresponding to a first coordinate region defined using a first horizontal axis and a first vertical axis, and a first touch panel for receiving a first touch input onto the first screen and storing first data corresponding to the first touch input into a first touch buffer corresponding to the first coordinate region, a second touch screen display including a second display panel for displaying a second screen based on a second display buffer corresponding to a second coordinate region defined using a second horizontal axis and a second vertical axis, and a second touch panel for receiving a second touch input onto the second screen and storing second data corresponding to the second touch input into a second touch buffer corresponding to the second coordinate region, a processor operatively connected to the first touch screen display and the second touch screen display, and a memory operatively connected to the processor, wherein the memory stores therein instructions which are executed by the processor to cause the processor to receive the first data based on the first coordinate region from the first touch panel, receive the second data based on the second coordinate region from the second touch panel, determine whether the first screen and the second screen are available, when the determination result satisfies a predefined condition, configure a virtual third coordinate region defined using a third horizontal axis and a third vertical axis, based on the first coordinate region and the second coordinate region, create a third touch buffer corresponding to the virtual third coordinate region, convert the first data and the second data to first virtual data and second virtual data using the virtual third coordinate region, respectively, store the first virtual data and the second virtual data in the third touch buffer, map the first display buffer and the second display buffer to the third touch buffer, based on the virtual third coordinate region, and apply an action corresponding to the first touch input and the second touch input to the first touch screen display and the second touch screen display, based on the first virtual data and the second virtual data.

Furthermore, a method for processing a touch input in an electronic device according to one embodiment disclosed in the disclosure includes receiving a first touch input onto a first screen displayed on a first display panel through a first touch panel, based on a first display buffer corresponding to a first coordinate region defined using a first horizontal axis and a first vertical axis, storing first data corresponding to the first touch input into a first touch buffer corresponding to the first coordinate region, receiving a second touch input onto a second screen displayed on a second display panel through a second touch panel, based on a second display buffer corresponding to a second coordinate region defined using a second horizontal axis and a second vertical axis, storing second data corresponding to the second touch input into a second touch buffer corresponding to the second coordinate region, identifying whether the first screen and the second screen are available, determining whether the identifying result satisfies a predefined condition, upon determination that the identifying result satisfies the predefined condition, configuring a virtual third coordinate region defined using a third horizontal axis and a third vertical axis, based on the first coordinate region and the second coordinate region, creating a third touch buffer corresponding to the virtual third coordinate region, converting the first data and the second data to first virtual data and second virtual data using the virtual third coordinate region, respectively, storing the first virtual data and the second virtual data into the third touch buffer, mapping the first display buffer and the second display buffer to the third touch buffer, based on the virtual third coordinate region, and applying an action corresponding to the first touch input and the second touch input to a first touch screen display and a second touch screen display, based on the first virtual data and the second virtual data, wherein the first touch screen display includes the first display panel and the first touch panel, and the second touch screen display includes the second display panel and the second touch panel.

Advantageous Effects

According to the embodiments disclosed in the disclosure, the plurality of touch inputs to the different touch screen displays may be processed as the plurality of touch inputs to a single touch screen display, thereby to prevent malfunction of touch inputs from a user who wants to use the plurality of touch screen displays as a single touch screen display.

In addition, various effects that may be directly or indirectly grasped based on the disclosure may be provided.

DESCRIPTION OF DRAWINGS

In connection with descriptions of the drawings, the same or similar reference numerals may indicate the same or similar components.

MODE FOR INVENTION

Figure 1:
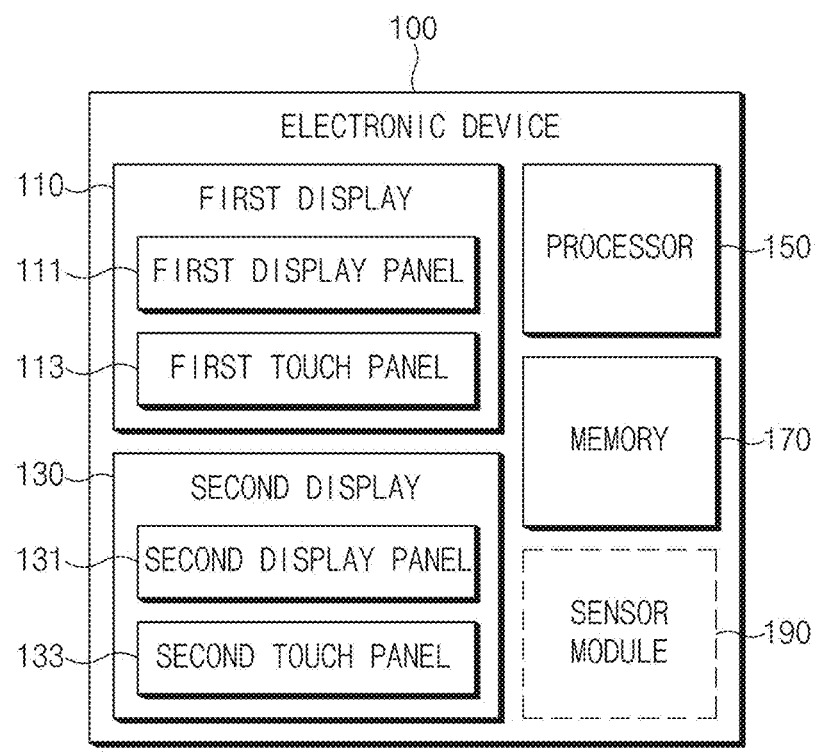
FIG. 1 is a block diagram of an electronic device related to touch input processing according to one embodiment.

FIG. 1 is a block diagram of an electronic device related to touch input processing according to one embodiment.

An electronic device 100 including a plurality of touch screen displays (e.g., a first display 110 and a second display 130) may independently operate the touch screen displays or allow at least two touch screen displays among the plurality of touch screen displays to act as a single touch screen display. For example, the electronic device 100 may output execution screens of different applications on the touch screen displays respectively, or may divide an execution screen of one application into a plurality of regions, and may output execution screens corresponding to the divided regions on the touch screen displays respectively, thereby to allow the plurality of touch screen displays to act as a single touch screen display.

Referring to FIG. 1, the electronic device 100 for performing the above-described function may include the first display 110, the second display 130, a processor 150, a memory 170, and a sensor module 190. However, a configuration of the electronic device 100 is not limited thereto. According to various embodiments, the electronic device 100 may not include at least one of the components described above or may further include at least one further component. In one example, the electronic device 100 may further include at least one display (e.g., a third display, or the like) different from the first display 110 and the second display 130.

The first display 110 and the second display 130 may display various contents (e.g., a text, an image, video, an icon, a symbol, etc.) to a user. The first display 110 or the second display 130 may include, for example, a liquid crystal display (LCD)), a light-emitting diode (LED) display, an organic LED (OLED) display, or a microelectromechanical system (MEMS) display, or an electronic paper display.

Each of the first display 110 and the second display 130 may include a display panel, and a display driver circuit (a display driver IC (DDI)) configured to control the display panel. For example, the first display 110 may include a first display panel 111, and a first display driver circuit (not shown) configured to control the first display panel 111. The second display 130 may include a second display panel 131, and a second display driver circuit (not shown) configured to control the second display panel 131.

The display panel (e.g., the first display panel 111 and the second display panel 131) includes a plurality of pixels. Each pixel may include sub-pixels that render RGB colors as three primary colors of light. Each of the sub-pixels may include at least one transistor. The pixel may be controlled to render a color according to a magnitude of a voltage (or current) across the transistor. The display driver circuit (e.g., the first display driver circuit and the second display driver circuit) may have an on/off function and may include a gate driver circuit to control a gate of the sub-pixel, and a source driver circuit that adjusts an image signal of the sub-pixel to render a varying color and may control the transistor of the sub-pixel and provide an entire screen. The display driver circuit may be configured to receive image data from the processor 150 and display an image or a picture on the display panel.

According to an embodiment, the display driver circuit may use a display buffer (or a frame buffer) corresponding to a plurality of pixels (and sub-pixels) included in the display panel to control the plurality of pixels to render a color. For example, when the processor 150 stores image data in the display buffer, the display driver circuit may control the plurality of pixels to render a color using the image data stored in the display buffer.

According to one embodiment, at least one of the display panels included in the first display 110 and the second display 130 may be implemented to be flat, flexible, or bendable.

In embodiments implementing the electronic device 100 including the plurality of displays, the processor 150 may process at least a portion of varying content (e.g., image data, image data stream, etc.) in various modules and parts of the electronic device 100. The processor 150 may decide to output the varying content to at least one of the first display 110 or the second display 130. For example, the processor 150 may cause the first display 110 to output an execution screen of a first application stored in the memory 170, and cause the second display 130 to display an execution screen of a second application stored in the memory 170. In another embodiment, the processor 150 may cause an image output on the first display 110 to be displayed on the second display 130 in a switched or enlarged manner or may cause an image output on the second display 130 to be displayed on the first display 110 in a switched or enlarged manner. For example, the processor 150 may cause the first display 110 and the second display 130 to divide an execution screen of one application stored in the memory 170 and display divided regions thereof respectively.

Each of the first display 110 and the second display 130 may include a touch panel and a touch control circuit configured to control the touch panel. For example, the first display 110 may include a first touch panel 113 and a first touch control circuit (not shown) configured to control the first touch panel 113. The second display 130 may include a second touch panel 133 and a second touch control circuit (not shown) configured to control the second touch panel 133. For example, each of the first display 110 and the second display 130 may act as a touch screen.

The touch panel (e.g., the first touch panel 113 and the second touch panel 133) may detect contact or access of a touch object (e.g., a user's body part or an electronic pen).

In one example, the touch panel may be embodied as a panel in which sensing electrodes made of a conductive material are arranged in a gird pattern. For example, the touch panel may acquire touch information (e.g., a touch position, etc.) using change in a capacitance that occurs when the touch object contacts or accesses the sensing electrodes. However, a scheme in which the touch panel detects the contact or access of the touch object is not limited to the above-described capacitance based scheme. According to various embodiments, the touch panel may detect the contact or access of the touch object via a pressure scheme, a resistance scheme, an infrared scheme, a sound wave scheme, an optical scheme, or an electromagnetic scheme.

The touch panel may measure a physical quantity (e.g., an amount of change in the capacitance) varying due to the contact or access of the touch object and may transfer the measured change in the physical quantity to the touch control circuit.

According to one embodiment, the touch control circuit may analyze the received physical quantity and may determine whether a touch input has occurred based on the analysis result. Further, the touch control circuit may analyze the received physical quantity and may acquire the touch information such as a position or an area of the touch input. In this case, the touch control circuit may transmit the acquired touch information to the processor 150. In some embodiments, the touch control circuit may transfer the received physical quantity to the processor 150 in a form of raw data. In this case, the processor 150 may analyze the received data and obtain the touch information such as a position or an area of the touch input.

According to one embodiment, the touch control circuit may store at least one of the measured physical quantity, raw data obtained by processing the physical quantity partially or the physical quantity as it is, or the touch information obtained via the analysis of the physical quantity into the touch buffer corresponding to a touch coordinate of the touch panel. In this case, the processor 150 may acquire the touch information about the touch input using data stored in the touch buffer.

According to one embodiment, the display panel and the touch panel may be provided in a form of one module.

The processor 150 may include one or more of a central processing unit (CPU), an application processor (AP), or a communication processor (CP). The processor 150 may perform an operation or data processing related to control and/or communication of at least one other components of the electronic device 100. In one example, the processor 150 may drive an operating system or an application program to control a plurality of hardware or software components connected to the processor 150 and may perform various data processing and operations. According to an embodiment, the processor 150 may further include a graphic processing unit (GPU) and/or an image signal processor.

According to one embodiment, the processor 150 may analyze data corresponding to the physical quantity measured via the touch panel and may determine whether the touch input has occurred, based on the analysis result. Further, the processor 150 may determine the touch information about the touch input, for example, the number of touch inputs, a location of the touch input, an occurrence time of the touch input, and a duration of the touch input. In some embodiments, the processor 150 may receive the touch information obtained via analysis of the measured physical quantity from the touch control circuit.

According to one embodiment, the processor 150 may process the touch input in a manner such that the touch input to a virtual touch panel incorporating the first touch panel 113 and the second touch panel 133 is processed. For example, the processor 150 may convert first data (e.g., first raw data) corresponding to a first touch input obtained through the first touch panel 113, and second data (e.g., second raw data) corresponding to a second touch input obtained through the second touch panel 133 into data (e.g., first virtual data and second virtual data) corresponding to a plurality of touch inputs to a virtual touch panel.

According to one embodiment, the processor 150 may create a virtual touch driver that includes instructions related to control of an operation of the virtual touch panel such that the virtual touch panel operates in the same manner as a manner in which the physically present touch panel (e.g., the first touch panel 113 and the second touch panel 133) operates. Then, the processor 150 may register (or install) the created virtual touch driver in the memory 170 (e.g., a middleware part (or framework)). In one example, the virtual touch driver may include instructions to cause the virtual touch panel to process a first touch input to a first coordinate region corresponding to the first touch panel 113 and a second touch input to a second coordinate region corresponding to the second touch panel 133 as the first and second touch inputs to a virtual third coordinate region incorporating the first coordinate region and the second coordinate region. In some embodiments, the virtual touch driver may map the third coordinate region to the first coordinate region, may map the third coordinate region to the second coordinate region, or may map the third coordinate region to an entire coordinate region incorporating the first coordinate region and the second coordinate region, based on characteristics of an application occupying a screen of the display (e.g., the first display 110 and the second display 130). According to one embodiment, the processor 150 may create and register the virtual touch driver when the electronic device 100 is booted.

The memory 170 may include volatile and/or nonvolatile memory. The memory 170 may store therein, for example, commands or data related to at least one other component of the electronic device 100. According to one embodiment, the memory 170 may store therein instructions related to touch input processing. Accordingly, when the instructions are executed by the processor 150, the processor 150 may perform a function related to touch input processing. Further, the memory 170 may store therein at least one application. The memory 170 may include an internal memory or an external memory.

The sensor module 190 may create an electrical signal or data value corresponding to an internal operating state (e.g., a power or a temperature) of the electronic device 100, or an external environmental state. According to one embodiment, the sensor module 190 may measure a physical quantity that changes according to a folded or unfolded state between the first display 110 and the second display 130 and may transfer the measured physical quantity to the processor 150. In this case, the processor 150 may analyze the received physical quantity to determine the folded or unfolded state between the first display 110 and the second display 130.

According to one embodiment, the sensor module 190 may include a Hall sensor. The Hall sensor may detect a magnetic field generated by a magnet using the property that a voltage changes according to an intensity of the magnetic field. According to one embodiment, the first display 110 and the second display 130 may be received in a first housing and a second housing, respectively, forming an appearance of the electronic device 100. The first housing and the second housing may pivot around one side thereof to be unfolded and folded. Further, the Hall sensor may be disposed inside an edge region of the first housing, and the magnet may be disposed inside an edge region of the second housing. Since the edge region of the first housing where the Hall sensor is placed and the edge region of the second housing where the magnet is disposed are brought into a folded state to each other when the first housing and the second housing are folded with each other, the Hall sensor may detect the magnetic field generated by the magnet. That is, when the intensity of the magnetic field sensed by the Hall sensor increases, it may be determined that the first housing and the second housing are being folded with each other. When the intensity of the magnetic field sensed by the Hall sensor decreases, it may be determined that the first housing and the second housing are being unfolded with each other.

Figure 2:
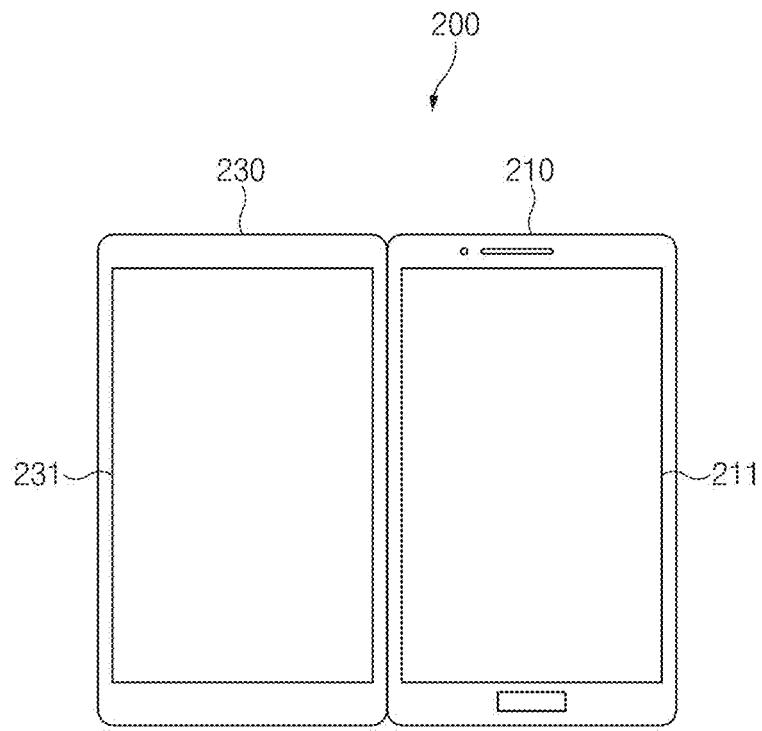
FIG. 2 is a view showing an electronic device having two touch screen displays according to an embodiment.

FIG. 2 is a view showing an electronic device having two touch screen displays according to an embodiment.

Referring to FIG. 2, an electronic device 200 (e.g., the electronic device 100) may include a first housing 210, a second housing 230, a first touch screen display 211 (e.g., the first display 110) and a second touch screen display 231 (e.g., the second display 130). The first housing 210 and the second housing 230 may be connected to each other to form an appearance of the electronic device 200 and may provide a space in which components of the electronic device 200 may be seated. According to one embodiment, the first touch screen display 211 may be mounted on the first housing 210 and the second touch screen display 231 may be mounted on the second housing 230.

According to one embodiment, the first housing 210 and the second housing 230 may pivot around one side thereof to be unfolded and folded with each other. In one example, the first housing 210 and the second housing 230 may pivot around a region at which they are connected to each other. In the illustrated FIG. 2, the first housing 210 and the second housing 230 may pivot around a left end of the first housing 210 and a right end of the second housing 230.

According to one embodiment, when the first housing 210 and the second housing 230 are in an unfolded state, the first touch screen display 211 may be exposed through a front surface of the first housing 210 and the second touch screen display 231 may be exposed through a front surface of the second housing 230 when viewed from a front surface of the electronic device 200. Further, when the first housing 210 and the second housing 230 are in a folded state, the front surface of the first housing 210 and the front surface of the second housing 230 are folded with each other to contact each other. In this case, the first touch screen display 211 exposed through the front surface of the first housing 210 and the second touch screen display 231 exposed through the front surface of the second housing 230 may be folded with each other to contact with other.

According to an embodiment, in a state in which the first touch screen display 211 and the second touch screen display 231 are unfolded with each other, the processor (e.g., the processor 150) of the electronic device 200 may output execution screens of different applications through the first touch screen display 211 and the second touch screen display 231 respectively. Alternatively, the processor may divide an execution screen of one application into two regions, and may output the divided two screen regions to the first touch screen display 211 and the second touch screen display 231, respectively.

Figure 3:
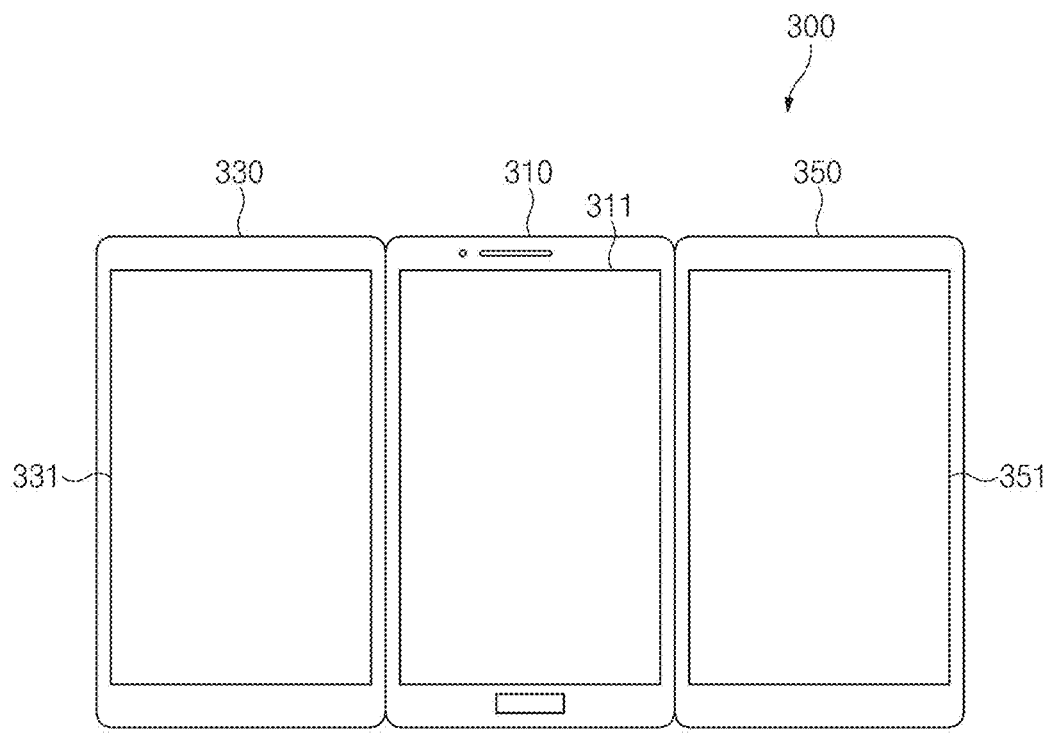
FIG. 3 is a view showing an electronic device having three touch screen displays according to an embodiment.

FIG. 3 is a view showing an electronic device having three touch screen displays according to an embodiment.

Referring to FIG. 3, an electronic device 300 (e.g., the electronic device 100) may include a first housing 310, a second housing 330, a third housing 350, a first touch screen display 311, a second touch screen display 331, and a third touch screen display 351. The first housing 310, the second housing 330, and the third housing 350 may be connected to each other to form an appearance of the electronic device 300. For example, a left end of the first housing 310 and a right end of the second housing 330 may be connected to each other, while a right end of the first housing 310 and a left end of the third housing 350 may be connected to each other. Further, each of the first housing 310, the second housing 330, and the third housing 350 may provide a space in which components of the electronic device 300 may be seated. According to one embodiment, the first touch screen display 311 may be mounted on the first housing 310, the second touch screen display 331 may be mounted on the second housing 330, and the third touch screen display 351 may be mounted on the third housing 350.

According to one embodiment, the first housing 310 and the second housing 330 may pivot around one side thereof to be unfolded and folded with each other. The first housing 310 and third housing 350 may pivot around one side thereof so that they may be unfolded and folded with each other. In one example, the first housing 310 and the second housing 330 may pivot around a region at which they are connected to each other. The first housing 310 and the third housing 350 may pivot around a region at which they are connected to each other. In the illustrated FIG. 3, the first housing 310 and the second housing 330 may pivot around a left end of the first housing 310 and a right end of the second housing 330, respectively. The first housing 310 and the third housing 350 may pivot around a right end of the first housing 310 and a left end of the third housing 350, respectively.

According to one embodiment, when the first housing 310, the second housing 330, and the third housing 350 are in an unfolded state, the first touch screen display 311 may be exposed through a front surface of the first housing 310, the second touch screen display 331 may be exposed through a front surface of the second housing 330, and the third touch screen display 351 may be exposed through a front surface of the third housing 350, when viewed from a front surface of the electronic device 300. Further, when the first housing 310 and the second housing 330 are folded with each other, the front surface of the first housing 310 and the front surface of the second housing 330 are folded with each other to contact each other. Thus, the first touch screen display 311 exposed through the front surface of the first housing 310 and the second touch screen display 331 exposed through the front surface of the second housing 330 may be folded with each other to contact each other. Similarly, when the first housing 310 and the third housing 350 are folded with each other, the front surface of the first housing 310 and the front surface of the third housing 350 are folded with each other to contact each other. Thus, the first touch screen display 311 exposed through the front surface of the first housing 310 and the third touch screen display 351 exposed through the front surface of the third housing 350 may be folded with each other to contact each other.

According to one embodiment, in a state in which all of the first touch screen display 311, the second touch screen display 331, and the third touch screen display 351 are in an unfolded state, the processor (e.g., the processor 150) of the electronic device 300 may output execution screens of different applications through the first touch screen display 311, the second touch screen display 331, and the third touch screen display 351, respectively. Alternatively, the processor may divide an execution screen of one application into at least two regions and may output the at least two regions through at least two touch screen displays among the first touch screen display 311, the second touch screen display 331, and third touch screen display 351, respectively.

According to one embodiment, when at least one of the first touch screen display 311, the second touch screen display 331, and the third touch screen display 351 is in a folded state, the processor (e.g., the processor 150) of the electronic device 300 may output the execution screen of the application only through a touch screen display which is in an unfolded state.

In FIG. 2 and FIG. 3 as described above, examples in which the electronic device includes the two touch screen displays or the three touch screen displays, respectively, have been described. However, the number of touch screen displays included in the electronic device is not limited thereto. When the number of touch screen displays included in the electronic device is at least two, features of the present disclosure may be applied thereto.

Further, in the above-described drawings, a case where whether the touch screen display outputs the screen is determined based on a folded or unfolded state thereof has been described above. However, the disclosure is not limited thereto. According to various embodiments, whether the touch screen display outputs the screen is determined based on whether a screen of the touch screen display is exposed to the user. For example, when the housings connected to each other pivot in a rear direction (e.g., a direction in which the touch screen display is not exposed) so that rear surfaces of the housings contact each other (e.g., in a state where the housings are folded with each other in a rearward direction), the processor may output the screen only on the touch screen display which is visible to the user, and may not output the screen on the touch screen display which is invisible to the user.

Figure 4:
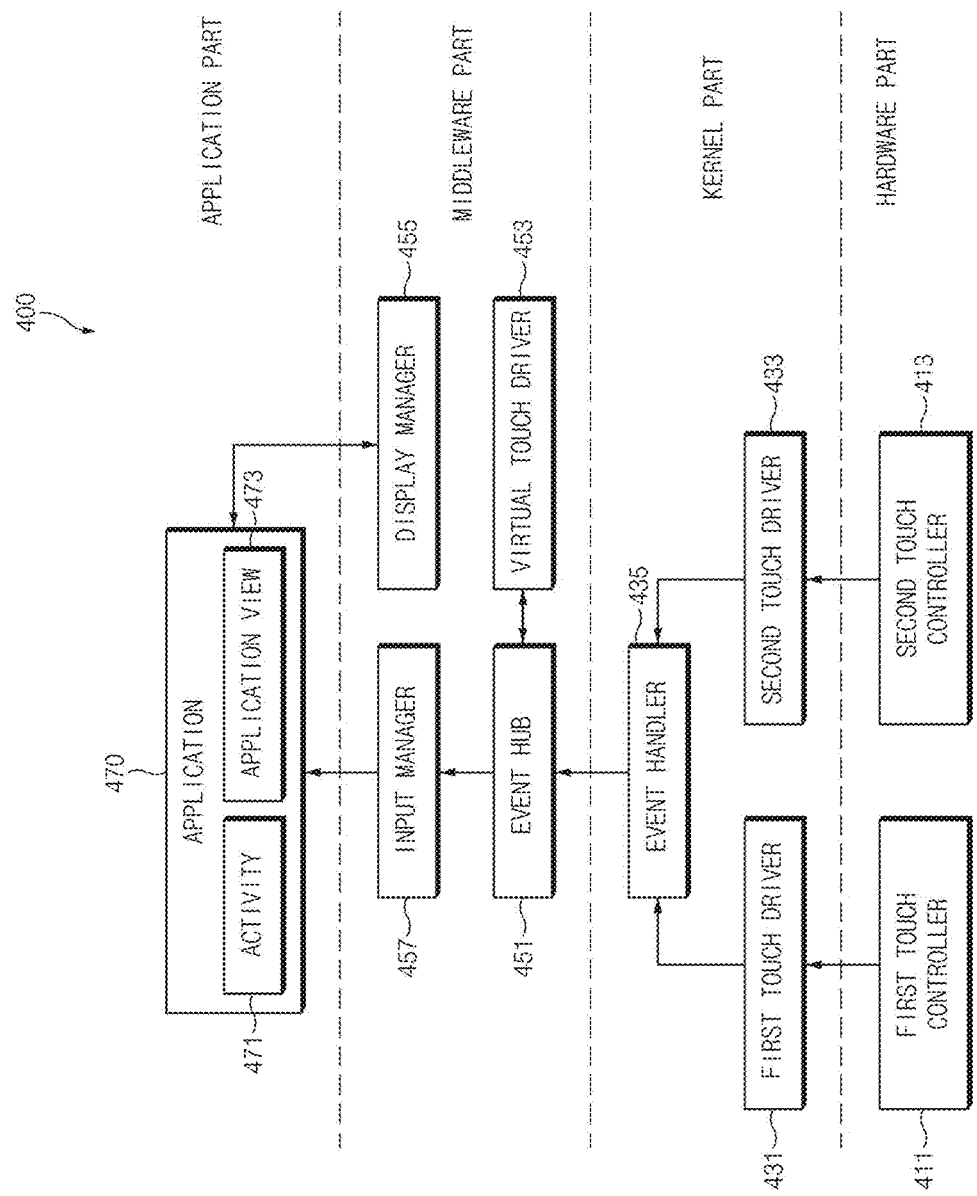
FIG. 4 is a system configuration diagram of an electronic device having a plurality of touch screen displays according to an embodiment.

FIG. 4 is a system configuration diagram of an electronic device having a plurality of touch screen displays according to an embodiment.

Referring to FIG. 4, an electronic device 400 (e.g., the electronic device 100) may include a hardware part and a software part. The hardware part may include a hardware device mounted on or connected to the electronic device 100 and a hardware controller configured to control the hardware device. According to one embodiment, the hardware part may include an input device and an input device controller configured to control the input device. The input device may include, for example, a touch input device. FIG. 4 shows a state in which the hardware part includes a first touch controller 411 configured to control a first touch input device and a second touch controller 413 configured to control a second touch input device. However, the disclosure is not limited thereto.

Each of the first touch controller 411 and the second touch controller 413 may have a configuration corresponding to that of the touch control circuit described in FIG. 1. For example, the first touch controller 411 and the second touch controller 413 may control a first touch panel (e.g., the first touch panel 113) and a second touch panel (e.g., the second touch panel 133) respectively. The first touch controller 411 and the second touch controller 413 may receive, for example, physical quantities that change due to contact or access of the touch object from the first touch panel and the second touch panel, respectively, and may transfer, to the processor (e.g., the processor 150), the received physical quantities as it is, raw data obtained by partially processing the received physical quantities, or touch information obtained by analyzing the received physical quantities. In this case, the processor may process the received data (or information). An operation of processing the data (or information) by the processor may be performed by executing a program (or a set of instructions) defined by each of components included in the software part.

The software part may include a kernel part, a middleware part (or a framework), and an application part. In one example, the kernel part may control or manage system resources used to execute operations or functions implemented in another software part. Further, the kernel part may provide an interface which allows the middleware part and the application part to access individual components of the electronic device 400 to control or manage the system resources.

The kernel part may include, for example, a first touch driver 431, a second touch driver 433, and an event handler 435. The first touch driver 431 and the second touch driver 433 may include instructions related to control of operations of the first touch controller 411 and the second touch controller 413, respectively. The event handler 435 may map an input received through the input device to an event (or signal) defined in a driver of the input device, and may transfer the mapped event to an event hub 451 included in the middleware part. For example, when a first touch input is received through the first touch panel, the first touch controller 411 may transmit data (or information) about the first touch input to the event handler 435 based on instructions defined in the first touch driver 431. Further, the event handler 435 may map data (or information) about the first touch input to a touch event, and may transfer the mapped touch event to the event hub 451. Similarly, when the second touch input is received through the second touch panel, the second touch controller 413 may transmit data (or information) about the second touch input to the event handler 435 based on instructions defined in the second touch driver 433. Further, the event handler 435 may map data (or information) about the second touch input to a touch event, and may transfer the mapped touch event to the event hub 451.

In one example, the middleware part (or framework) may act as a relay so that the application part may communicate with the kernel part to exchange data therewith. Further, the middleware part may process one or more work requests received from the application part according to priority. For example, the middleware part may allocate a priority related to use of a system resource of the electronic device 400 to at least one application 470 included in the application part, and may process the one or more work requests. The middleware part may include the event hub 451, a virtual touch driver 453, a display manager 455, and an input manager 457.

The event hub 451 may deliver the event received from the event handler 435 to the at least one application 470 included in the application part. In one example, the event hub 451 may deliver the event to the application 470 registered so as to receive the event.

According to one embodiment, the event hub 451 may differently process the event received from the event handler 435 based on characteristics of the application 470. In one example, when the application 470 occupies only a screen region (a first coordinate region) of a first display corresponding to a first touch panel, the event hub 451 may transmit only a touch event related to a first touch input to the first touch panel among events received from the event handler 435 to the application 470. In another example, when the application 470 occupies only a screen region (a second coordinate region) of a second display corresponding to a second touch panel, the event hub 451 may transmit only a touch event related to a second touch input to the second touch panel among the events received from the event handler 435 to the application 470. In another example, when the application 470 occupies both the screen region of the first display (the first coordinate region) and the screen region of the second display (the second coordinate region), the event hub 451 may deliver all events received from the event handler 435 to the application 470. In this case, the event hub 451 may process the events in a corresponding manner to a virtual third coordinate region incorporating the first coordinate region and the second coordinate region, and transmit the processed events to the application 470. For example, the event hub 451 may process information about the first touch input to the first coordinate region and information about the second touch input to the second coordinate region as the information about the first touch input and second touch input to the third coordinate region. That is, the event hub 451 may change a touch coordinate where the first touch input occurs and a touch coordinate where the second touch input occurs in a corresponding manner to the third coordinate region, respectively.

The virtual touch driver 453 may include instructions related to control of an operation of the virtual touch panel so that the virtual touch panel may operate as a physically existing touch panel. In one example, the virtual touch driver 453 may include instructions to cause the virtual touch panel to process the first touch input to the first coordinate region corresponding to the first touch panel and the second touch input to the second coordinate region corresponding to the second touch panel as the first and second touch inputs to a virtual third coordinate region incorporating the first coordinate region and the second coordinate region. According to one embodiment, the virtual touch driver 453 may be created and registered when the electronic device 400 is booted.

The display manager 455 may manage a graphic effect to be provided to the user or a user interface related thereto. The display manager 455 may manage a system resource used to display the execution screen of the application 470 on the display. The display manager 455 may set or obtain a screen size of the display. Further, the display manager 455 may adjust the screen to fit a size of an application view 473 defined by the application 470.

The input manager 457 may detect and register an input device registered in the kernel part, and may receive an input event that occurs in the input device via the event hub 451, and may control the input device. For example, the input manager 457 may detect and register a touch panel registered in the kernel part, and may receive a touch input event to the registered touch panel via the event hub 451, and may control the touch panel. Further, the input manager 457 may identify whether the virtual touch panel is available, and, if so, may create and register the virtual touch driver 453. In some embodiments, the input manager 457 may create and register the virtual touch driver 453 when the electronic device is booted.

The application part may include the at least one application 470. The application 470 may include instructions configured to perform a function designated through the user interface. The application 470 may include an activity 471 and the application view 473. The activity 471 may interact with the user via the user interface, and may request data or a service to other activities 471. The application view 473 may manage setting information or resources for configuring the screen. For example, the application view 473 may manage a size, layout information, and the like of the screen.

Figure 5:
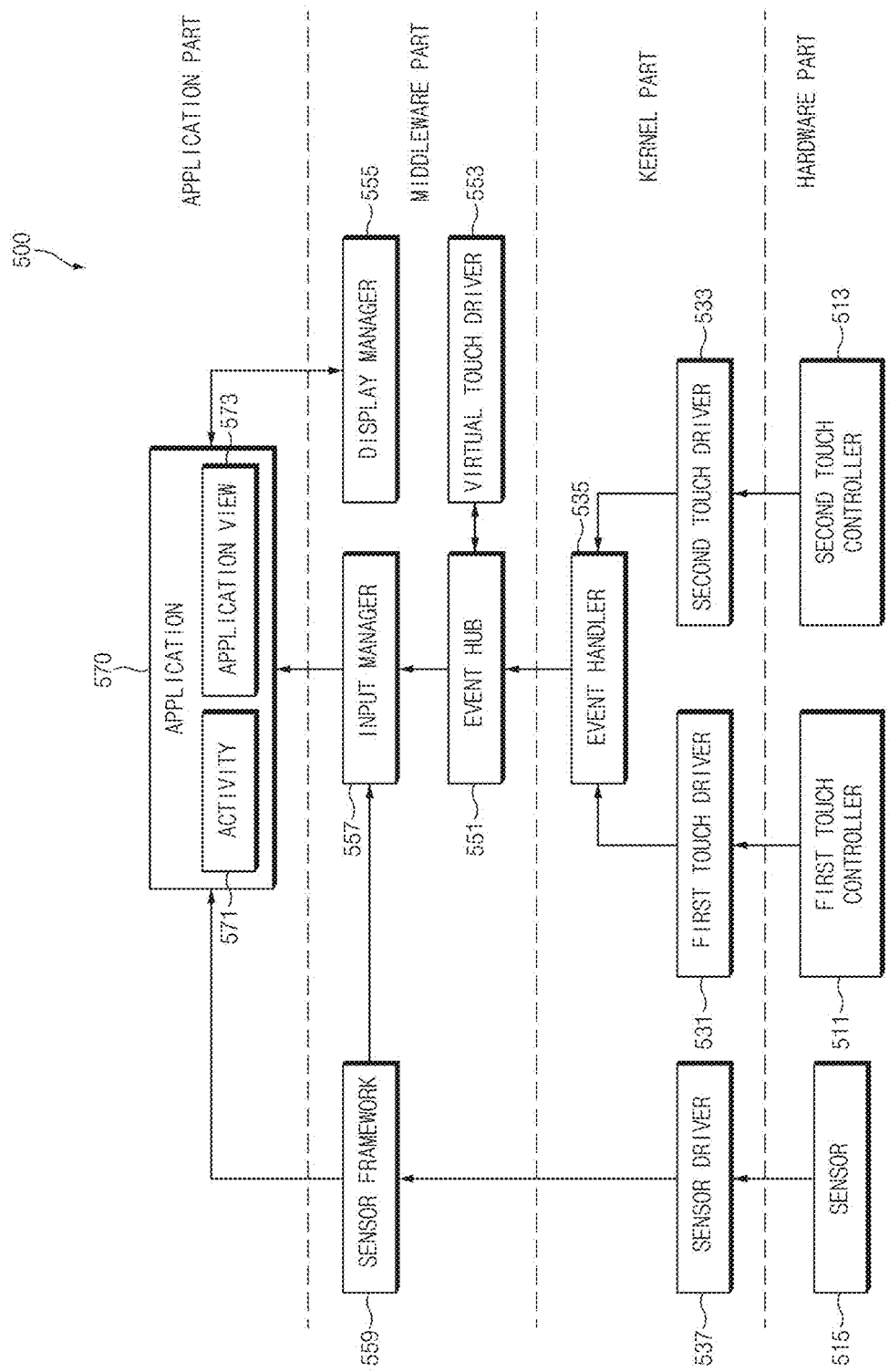
FIG. 5 is a system configuration diagram of an electronic device including a sensor capable of identifying a folded or unfolded state between a plurality of touch screen displays according to an embodiment.

FIG. 5 is a system configuration diagram of an electronic device including a sensor that may identify a folded or unfolded state between a plurality of touch screen displays according to an embodiment.

In FIG. 5, descriptions of components that are the same or similar to the components described in FIG. 4 will be omitted. Components having the same names among the components shown in FIG. 4 and FIG. 5 may perform the same or similar functions.

A processor (e.g., the processor 150) of an electronic device 500 may execute a program (or a set of instructions) defined by each of components included in the software part (e.g., the kernel part, the middleware part, the application part, etc.). According to one embodiment, the processor may determine whether to output the screen based on the folded or unfolded state between touch screen displays (e.g., the first touch screen display 311 and the second touch screen display 331). For example, the processor may output the execution screen of an application 570 only to the touch screen display whose a screen is exposed to an outside among the touch screen displays in a state in which the touch screen displays are unfolded with each other. Further, when there are multiple touch screen displays whose the screens are exposed to the outside among the touch screen displays, the processor may operate the multiple touch screen displays as a single touch screen display. For example, the processor may process the touch inputs to the plurality of touch screen displays as a multi-touch input (or gesture input) to a single touch screen display incorporating the plurality of touch screen displays.

According to one embodiment, the electronic device 500 may include a component that may identify the folded or unfolded state between the touch screen displays. In one example, the electronic device 500 may include a sensor 515 in the hardware part. The sensor 515 may include, for example, a Hall sensor. The Hall sensor may detect a magnetic field generated by the magnet using the property that a voltage changes according to an intensity of the magnetic field. According to one embodiment, the plurality of touch screen displays may be respectively disposed in different housings. The housings may be connected to each other and may pivot around one side thereof. In this case, the sensor 515 may be disposed inside an edge region of one housing. When the sensor 515 is the Hall sensor, the magnet may be disposed inside another housing connected to the housing in which the sensor 515 is disposed. That is, since the edge region of the housing in which the Hall sensor is placed and the edge region of the housing in which the magnet is placed approach each other as the housings are folded with each other, the Hall sensor may detect the magnetic field generated by the magnet. Accordingly, when the intensity of the magnetic field sensed by the Hall sensor increases, it may be determined that the housings are folded with each other. When the intensity of the magnetic field sensed by the Hall sensor decreases, it may be considered that the housings are unfolded with each other.

The kernel part may include a sensor driver 537 including instructions related to control of an operation of the sensor 515. Further, the middleware part may include a sensor framework 559 that analyzes sensing information received from the sensor 515. The sensor framework 559 may, for example, analyze the sensing information to determine the folded or unfolded state between the touch screen displays. Further, the sensor framework 559 may analyze the sensing information to determine a degree to which the touch screen displays are unfolded with each other (e.g., an angle formed by the touch screen displays).

According to one embodiment, the sensor framework 559 may inform an input manager 557 of the folded or unfolded state or the unfolded degree between the touch screen displays. In this case, the input manager 557 may transfer the folded or unfolded state or the unfolded degree between the touch screen displays to a window manager (not shown). The window manager may transfer the folded or unfolded state or the unfolded degree between the touch screen displays to a display manager 555. The display manager 555 may adjust a size and a position of a screen to be output in response to a call from the window manager. The input manager 557 may change touch-related properties defined in the virtual touch driver 553 based on the folded or unfolded state or the unfolded degree between the touch screen displays. In one example, when a function (e.g., a full screen function) that a plurality of touch screen displays act as a single touch screen display is activated, the input manager 557 may perform an input operation via a virtual touch driver 553. In another example, when a function (e.g., a single screen function) that the plurality of touch screen displays act as separate touch screen displays respectively is activated, the input manager 557 may perform an input operation via each touch driver corresponding to each touch panel included in each touch screen display. In this case, a power manager (not shown) may cut off power to a touch screen display that is not used, thereby to reduce power consumption.

As described above, according to various embodiments, an electronic device includes a first touch screen display including a first touch panel having a first coordinate region defined using a first horizontal axis and a first vertical axis, a second touch screen display including a second touch panel having a second coordinate region defined using a second horizontal axis and a second vertical axis, a processor operatively connected to the first touch screen display and the second touch screen display, and a memory operatively connected to the processor, wherein the memory stores therein instructions which are executed by the processor to cause the processor to configure a virtual third coordinate region defined using a third horizontal axis and a third vertical axis, receive first data from the first touch panel, wherein the first data is associated with a first touch input received through the first touch screen display, and is based on the first coordinate region, receive second data from the second touch panel, wherein the second data is associated with a second touch input received through the second touch screen display and is based on the second coordinate region, convert the first data and the second data to first virtual data and second virtual data using the virtual third coordinate region, respectively, and apply an action corresponding to the first touch input and the second touch input to the first touch screen display and the second touch screen display, based on the first virtual data and the second virtual data.

According to various embodiments, a horizontal component value of a point where the third horizontal axis meets a virtual vertical line may be the same as a horizontal component value of a point where at least one of the first horizontal axis or the second horizontal axis meets the virtual vertical line, and a vertical component value of a point where the third vertical axis meets a virtual horizontal line may be the same as a vertical component value of a point where at least one of the first vertical axis or the second vertical axis meets the virtual horizontal line.

According to various embodiments, the horizontal component value of the point where the third horizontal axis meets the virtual vertical line may be the same as the horizontal component value of the point where the first horizontal axis meets the virtual vertical line, and the vertical component values of the points where the first vertical axis, the second vertical axis, and the third vertical axis meet the virtual horizontal line, respectively may be the same as each other.

According to various embodiments, the vertical component value of the point where the third vertical axis meets the virtual horizontal line may be the same as the vertical component value of the point where the first vertical axis meets the virtual horizontal line, and the horizontal component values of the points where the first horizontal axis, the second horizontal axis, and the third horizontal axis meet the virtual vertical line, respectively may be the same as each other.

According to various embodiments, the memory may further store therein an application including an user interface. The instructions may cause the processor to display the user interface on the first touch screen display and the second touch screen display, and change at least a portion of the user interface, based on the first virtual data and the second virtual data.

According to various embodiments, the first touch input and the second touch input may be received substantially simultaneously.

According to various embodiments, the electronic device may further include a Hall sensor. When the instructions are executed by the processor, the instructions may cause the processor to configure the virtual third coordinate region in response to reception of a signal from the Hall sensor.

According to various embodiments, the electronic device may further include a first housing and a second housing, wherein the first and second housings are folded or unfolded with each other, wherein the first touch screen display is placed on the first housing, wherein the second touch screen display is placed on the second housing.

As described above, according to various embodiments, an electronic device includes a first touch screen display including a first display panel for displaying a first screen based on a first display buffer corresponding to a first coordinate region defined using a first horizontal axis and a first vertical axis, and a first touch panel for receiving a first touch input onto the first screen and storing first data corresponding to the first touch input into a first touch buffer corresponding to the first coordinate region, a second touch screen display including a second display panel for displaying a second screen based on a second display buffer corresponding to a second coordinate region defined using a second horizontal axis and a second vertical axis, and a second touch panel for receiving a second touch input onto the second screen and storing second data corresponding to the second touch input into a second touch buffer corresponding to the second coordinate region, a processor operatively connected to the first touch screen display and the second touch screen display, and a memory operatively connected to the processor, wherein the memory stores therein instructions which are executed by the processor to cause the processor to receive the first data based on the first coordinate region from the first touch panel, receive the second data based on the second coordinate region from the second touch panel, determine whether the first screen and the second screen are available, when the determination result satisfies a predefined condition, configure a virtual third coordinate region defined using a third horizontal axis and a third vertical axis, based on the first coordinate region and the second coordinate region, create a third touch buffer corresponding to the virtual third coordinate region, convert the first data and the second data to first virtual data and second virtual data using the virtual third coordinate region, respectively, store the first virtual data and the second virtual data in the third touch buffer, map the first display buffer and the second display buffer to the third touch buffer, based on the virtual third coordinate region, and apply an action corresponding to the first touch input and the second touch input to the first touch screen display and the second touch screen display, based on the first virtual data and the second virtual data.

According to various embodiments, a horizontal component value of a point where the third horizontal axis meets a virtual vertical line may be the same as a horizontal component value of a point where at least one of the first horizontal axis or the second horizontal axis meets the virtual vertical line. A vertical component value of a point where the third vertical axis meets the virtual horizontal line may be the same as a vertical component value of a point where at least one of the first vertical axis or the second vertical axis meets the virtual horizontal line.

According to various embodiments, the first touch input and the second touch input may be received substantially simultaneously.

According to various embodiments, the memory may further store therein an application including a user interface. The determining of whether the first screen and the second screen are available includes determining whether the user interface is displayed on the first screen and the second screen. Thus, upon determination that the user interface is displayed on the first screen and the second screen, the determination result satisfies the predefined condition.

According to various embodiments, the electronic device may further include a first housing and a second housing, wherein the first and second housings are folded or unfolded with each other, wherein the first touch screen display is placed on the first housing, wherein the second touch screen display is placed on the second housing.

According to various embodiments, the electronic device may further include a sensor module that acquires sensor information for determining a folded or unfolded state between the first housing and the second housing. The determining of whether the first screen and the second screen are available includes receiving, by the processor, the sensor information from the sensor module, and determining, by the processor, a folded or unfolded state between the first housing and the second housing, based on the sensor information, determining, by the processor, an unfolded angle between the first touch screen display and the second touch screen display when the first housing and the second housing are unfolded with each other, and when the angle is included within a predefined angle range, determining, by the processor, that the predefined condition is satisfied.

According to various embodiments, the sensor module may include a Hall sensor.

As described above, according to various embodiments, an electronic device includes a first touch screen display including a first touch panel including a first coordinate system defined using a first horizontal dimension (x1) and a first vertical dimension (y1), a second touch screen display including a second touch panel including a second coordinate system defined using a second horizontal dimension (x2) and a second vertical dimension (y2), a processor operatively connected to the first touch screen display and the second touch screen display, and a memory operatively connected to the processor, wherein the memory stores therein instructions which are executed by the processor to cause the processor to configure a virtual coordinate region defined based on the first vertical dimension and a sum of the first horizontal dimension and the second horizontal dimension, receive a first touch input from the first touch panel, receive a second touch input from the second touch panel, receive first data from the first panel, wherein the first data is associated with the first touch input and is based on the first coordinate system, receive second data from the second panel, wherein the second data is associated with the second touch input and is based on the second coordinate system, convert the first data and the second data into first virtual data and second virtual data based on the virtual coordinate region, and apply an action corresponding to the first touch input and the second touch input to the first touch screen display and the second touch screen display, based on the first virtual data and the second virtual data.

Figure 6:
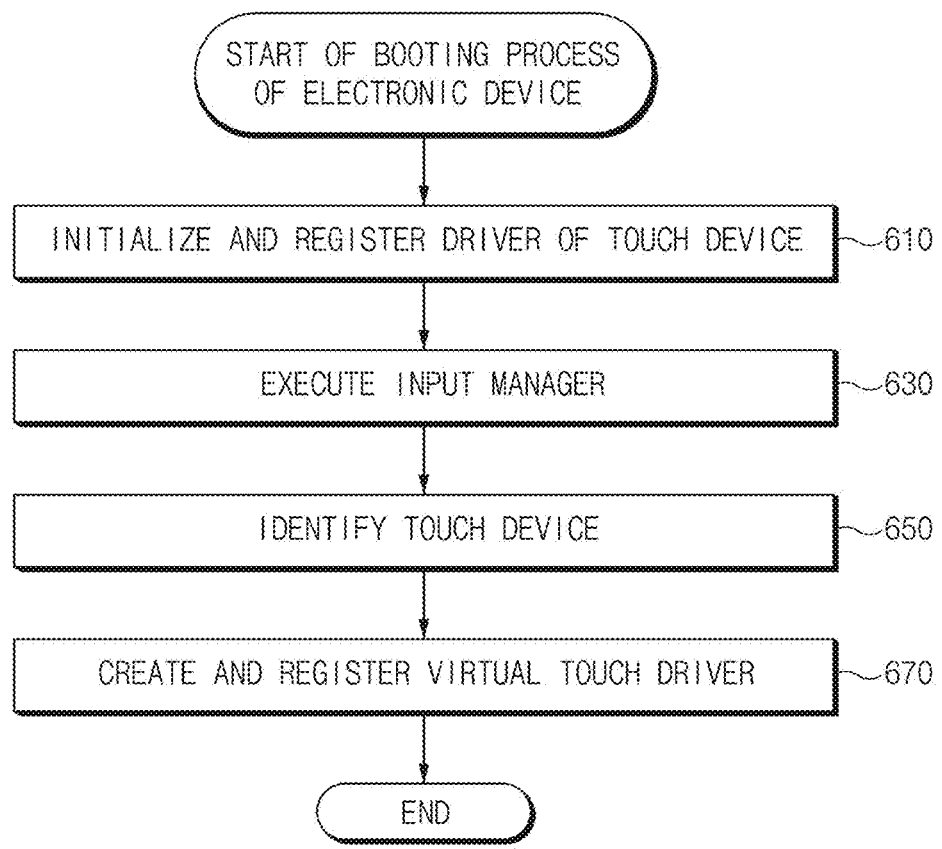
FIG. 6 is a diagram showing an operating method of an electronic device related to setting of a virtual touch panel according to an embodiment.

FIG. 6 is a diagram showing an operating method of the electronic device related to setting of the virtual touch panel according to an embodiment.

Referring to FIG. 6, when a booting process of the electronic device starts, a processor (e.g., the processor 150) of the electronic device (e.g., the electronic device 100) may initialize and register a driver of a touch device at operation 610. Further, while a plurality of touch drivers are executed, a plurality of touch devices may be registered.

At operation 630, the processor may execute an input manager (e.g., the input manager 457).

At operation 650, the input manager may identify an available touch device. In some embodiments, the input manager may register an available touch device and may create and register a touch driver that includes instructions related to control of an operation of the registered touch device.

At operation 670, the input manager may create and register a virtual touch driver. In one example, the input manager may identify whether a virtual touch panel is available. When the virtual touch panel is available, the input manager may create and register a virtual touch drive. A state in which the virtual touch panel is available may include, for example, a state in which adjacent at least two touch screen displays are exposed to an outside while a plurality of touch screen displays are unfolded with each other. That is, the virtual touch panel is available in a state where screens of the two or more adjacent touch screen displays act as one screen.

Figure 7:
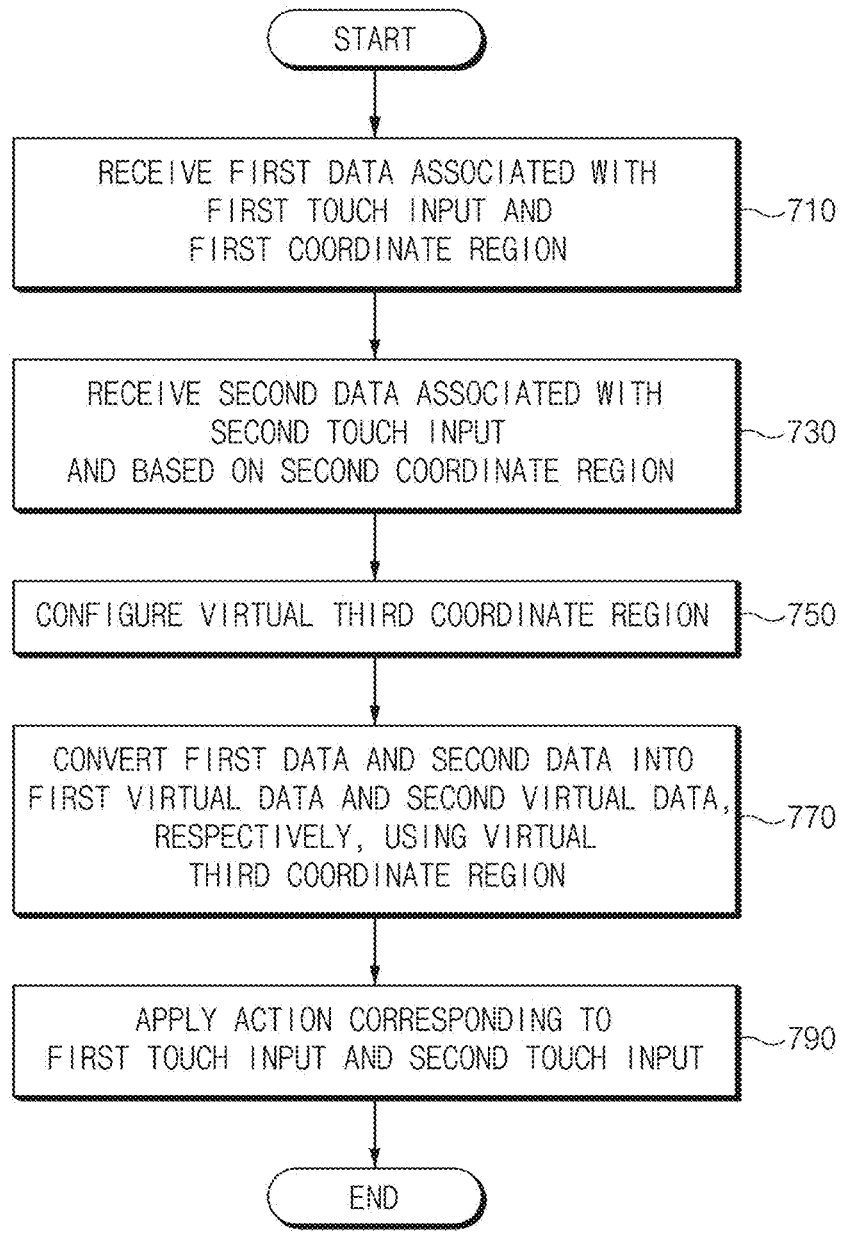
FIG. 7 is a diagram showing an operating method of an electronic device related to touch input processing according to an embodiment.

FIG. 7 is a diagram showing an operating method of an electronic device related to touch input processing according to an embodiment.

Referring to FIG. 7, at operation 710, a processor (e.g., the processor 150) of an electronic device (e.g., the electronic device 100) may receive first data associated with the first touch input onto a screen of a first display (e.g., the first display 110) from a first touch panel (e.g., the first touch panel 113) having a first coordinate region defined using a first horizontal axis (e.g., an X1 axis) and a first vertical axis (e.g., an Y1 axis). The first data may be, for example, data based on the first coordinate region.

At operation 730, the processor may receive second data associated with a second touch input onto a screen of a second display (e.g., the second display 130) from a second touch panel (e.g., the second touch panel 133) having a second coordinate region defined using a second horizontal axis (e.g., an X2 axis) and a second vertical axis (e.g., an Y2 axis). The second data may be, for example, data based on the second coordinate region.

At operation 750, the processor may configure a virtual third coordinate region defined using a third horizontal axis (e.g., an X3 axis) and a third vertical axis (e.g., an Y3 axis). The virtual third coordinate region may be, for example, a coordinate region incorporating the first coordinate region and the second coordinate region.

At operation 770, the processor may convert the first data and the second data into first virtual data and second virtual data, respectively, using the virtual third coordinate region.

In one example, when horizontal component values of points where the first horizontal axis and the second horizontal axis meet a virtual vertical line, respectively are the same as each other, (e.g., when a left end of the first touch panel and a left end of the second touch panel coincide with each other in a horizontal direction), the third horizontal axis of the virtual third coordinate region may be set to be the same as the first horizontal axis or the second horizontal axis. In this case, the processor may set horizontal component values of the first virtual data and the second virtual data to be the same as horizontal component values of the first data and the second data, respectively. Further, the processor may set a vertical component value of the first virtual data or the second virtual data based on a vertical positional relationship between the first touch panel and the second touch panel. For example, when the first touch panel is located below the second touch panel, the processor may set the vertical component value of the first virtual data to be the same as the vertical component value of the first data, and set the vertical component value of the second virtual data to a sum of the vertical component value of the second data and a vertical length of the first touch panel. In another example, when the first touch panel is located above the second touch panel, the processor may set the vertical component value of the second virtual data to be the same as the vertical component value of the second data, and may set the vertical component value of the first virtual data to a sum of the vertical component value of the first data and a vertical length of the second touch panel.

In one example, when vertical component values of points where the first vertical axis and the second vertical axis meet the virtual horizontal line, respectively are the same as each other (e.g., when a lower end of the first touch panel and a lower end of the second touch panel coincide with each other in a vertical direction), the third vertical axis of the virtual third coordinate region may be set to the first vertical axis or the second vertical axis. In this case, the processor may set the vertical component values of the first virtual data and the second virtual data to be the same as the vertical component values of the first data and the second data, respectively. Further, the processor may set the horizontal component value of the first virtual data or the second virtual data based on a horizontal direction positional relationship between the first touch panel and the second touch panel. For example, when the first touch panel is located on a left side of the second touch panel, the processor may set the horizontal component value of the first virtual data to be the same as the horizontal component value of the first data, and may set the horizontal component value of the second virtual data to a sum of the horizontal component value of the second data and a horizontal length of the first touch panel. In another example, when the first touch panel is located on a right side of the second touch panel, the processor may set the horizontal component value of the second virtual data to be the same as the horizontal component value of the second data, and may set the horizontal component value of the first virtual data to a sum of the horizontal component value of the first data and a horizontal length of the second touch panel.

At operation 790, the processor may apply an action corresponding to the first touch input and the second touch input to the first display and the second display. In one example, the processor may process the first touch input to the first display and the second touch input to the second display as a plurality of touch inputs (e.g., multi-touch) to a single display.

Figure 8:
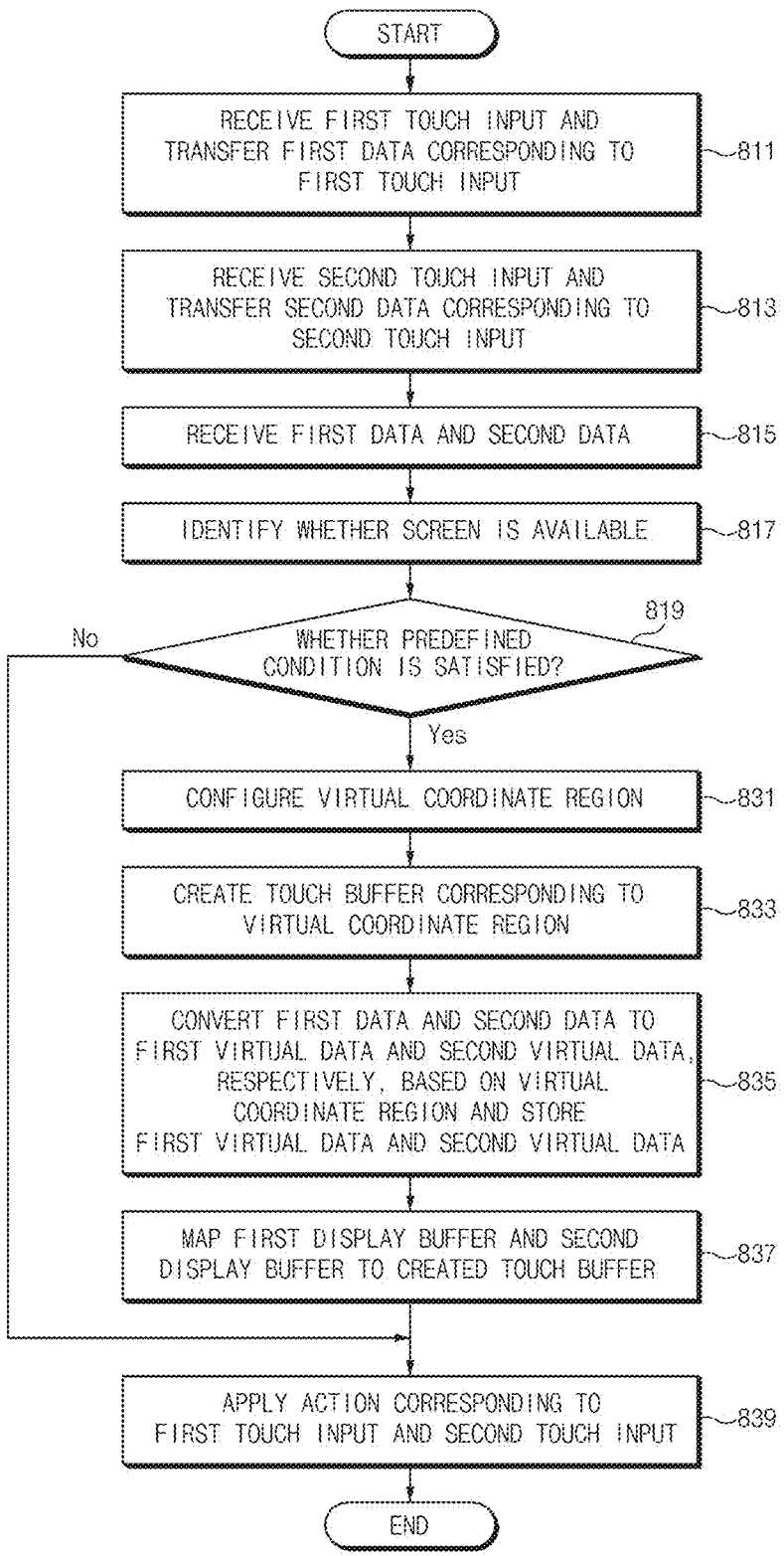
FIG. 8 is a diagram showing another operating method of an electronic device related to touch input processing according to an embodiment.

FIG. 8 is a diagram showing another operating method of an electronic device related to touch input processing according to an embodiment.

Referring to FIG. 8, at operation 811, a first touch panel (e.g., the first touch panel 113) of an electronic device (e.g., the electronic device 100) may receive a first touch input to a screen of a first display (e.g., the first display 110) and may transfer first data (first touch information) corresponding to the first touch input to a processor (e.g., the processor 150) of the electronic device. The first touch panel may have a first coordinate region defined using a first horizontal axis and a first vertical axis. Further, the first touch buffer may have a size corresponding to the first coordinate region.

At operation 813, a second touch panel (e.g., the second touch panel (133)) of the electronic device may receive a second touch input to a screen of a second display (e.g., the second display (130)) and may transfer second data (second touch information) corresponding to the second touch input to the processor. The second touch panel may have a second coordinate region defined using a second horizontal axis and a second vertical axis. Further, the second touch buffer may have a size corresponding to the second coordinate region.

At operation 815, the processor may receive the first data and the second data. In one example, the processor may receive the first data from the first touch panel, and may receive the second data from the second touch panel. Further, the processor may store the first data and the second data in the first touch buffer and the second touch buffer, respectively.

At operation 817, the processor may identify whether the screen is available. According to one embodiment, the processor may determine whether the screens of the first display and the second display are available. The first display and the second display may be disposed in a first housing (e.g., the first housing 210) and a second housing (e.g., the second housing 230), respectively. The first housing and the second housing may be unfolded and folded with each other while pivoting about one side thereof. When the first housing and the second housing are in a folded state, the screens of the first display and the second display are not exposed to the outside. Thus, the processor may determine that the screens of the first display and the second display are in an unavailable state. Further, when the first housing and the second housing are in an unfolded state, the screens of the first display and the second display are exposed to the outside. Thus, the processor may determine that the screens of the first display and the second display are in an available state.

At operation 819, the processor may determine whether a predefined condition is satisfied. The predefined condition may include, for example, a condition in which the screens of the first display and the second display are available.

When the predefined condition is not satisfied, the processor may apply an action corresponding to the first touch input and an action corresponding to the second touch input to the first display and the second display, respectively at operation 839. That is, the processor may process the first touch input and the second touch input as separate touch inputs to the first display and the second display, respectively.

When the predefined condition is satisfied, the processor may configure a virtual coordinate region at operation 831. For example, the processor may configure the virtual coordinate region that incorporates the first coordinate region and the second coordinate region.

At operation 833, the processor may create a touch buffer corresponding to the virtual coordinate region. For example, the processor may create the touch buffer to have a size of the virtual coordinate region.

At operation 835, the processor may convert the first data and the second data to the first virtual data and the second virtual data, respectively, based on the virtual coordinate region and may store the first virtual data and the second virtual data in the created touch buffer.

In one example, when horizontal component values of points where the first horizontal axis and the second horizontal axis meet a virtual vertical line, respectively are the same as each other, (e.g., when a left end of the first touch panel and a left end of the second touch panel coincide with each other in a horizontal direction), the third horizontal axis of the virtual third coordinate region may be set to be the same as the first horizontal axis or the second horizontal axis. In this case, the processor may set horizontal component values of the first virtual data and the second virtual data to be the same as horizontal component values of the first data and the second data, respectively. Further, the processor may set a vertical component value of the first virtual data or the second virtual data based on a vertical positional relationship between the first touch panel and the second touch panel. For example, when the first touch panel is located below the second touch panel, the processor may set the vertical component value of the first virtual data to be the same as the vertical component value of the first data, and set the vertical component value of the second virtual data to a sum of the vertical component value of the second data and a vertical length of the first touch panel. In another example, when the first touch panel is located above the second touch panel, the processor may set the vertical component value of the second virtual data to be the same as the vertical component value of the second data, and may set the vertical component value of the first virtual data to a sum of the vertical component value of the first data and a vertical length of the second touch panel.

In one example, when vertical component values of points where the first vertical axis and the second vertical axis meet the virtual horizontal line, respectively are the same as each other (e.g., when a lower end of the first touch panel and a lower end of the second touch panel coincide with each other in a vertical direction), the third vertical axis of the virtual third coordinate region may be set to the first vertical axis or the second vertical axis. In this case, the processor may set the vertical component values of the first virtual data and the second virtual data to be the same as the vertical component values of the first data and the second data, respectively. Further, the processor may set the horizontal component value of the first virtual data or the second virtual data based on a horizontal direction positional relationship between the first touch panel and the second touch panel. For example, when the first touch panel is located on a left side of the second touch panel, the processor may set the horizontal component value of the first virtual data to be the same as the horizontal component value of the first data, and may set the horizontal component value of the second virtual data to a sum of the horizontal component value of the second data and a horizontal length of the first touch panel. In another example, when the first touch panel is located on a right side of the second touch panel, the processor may set the horizontal component value of the second virtual data to be the same as the horizontal component value of the second data, and may set the horizontal component value of the first virtual data to a sum of the horizontal component value of the first data and a horizontal length of the second touch panel.

At operation 837, the processor may map the first display buffer corresponding to the first display and the second display buffer corresponding to the second display to the created touch buffer. For example, the processor may map the first display buffer and the second display buffer to the virtual coordinate region corresponding to the touch buffer. That is, the processor may configure a region occupied by the first display and a region occupied by the second display among the virtual coordinate region.

After operation 837 is performed, the processor may apply an action corresponding to the first touch input and the second touch input to the first display and the second display at operation 839. The processor may process the first touch input to the first display and the second touch input to the second display as multi-touch inputs to a single integrated display. That is, the processor may process the first touch input and the second touch input as a combination of a plurality of touch inputs instead of separate touch inputs.

As described above, according to various embodiments, a method for processing an touch input in an electronic device includes receiving a first touch input onto a first screen displayed on a first display panel through a first touch panel, based on a first display buffer corresponding to a first coordinate region defined using a first horizontal axis and a first vertical axis, storing first data corresponding to the first touch input into a first touch buffer corresponding to the first coordinate region, receiving a second touch input onto a second screen displayed on a second display panel through a second touch panel, based on a second display buffer corresponding to a second coordinate region defined using a second horizontal axis and a second vertical axis, storing second data corresponding to the second touch input into a second touch buffer corresponding to the second coordinate region, identifying whether the first screen and the second screen are available, determining whether the identifying result satisfies a predefined condition, upon determination that the identifying result satisfies the predefined condition, configuring a virtual third coordinate region defined using a third horizontal axis and a third vertical axis, based on the first coordinate region and the second coordinate region, creating a third touch buffer corresponding to the virtual third coordinate region, converting the first data and the second data to first virtual data and second virtual data using the virtual third coordinate region, respectively, storing the first virtual data and the second virtual data into the third touch buffer, mapping the first display buffer and the second display buffer to the third touch buffer, based on the virtual third coordinate region, and applying an action corresponding to the first touch input and the second touch input to a first touch screen display and a second touch screen display, based on the first virtual data and the second virtual data, wherein the first touch screen display includes the first display panel and the first touch panel, and the second touch screen display includes the second display panel and the second touch panel.

According to various embodiments, a horizontal component value of a point where the third horizontal axis meets a virtual vertical line may be the same as a horizontal component value of a point where at least one of the first horizontal axis or the second horizontal axis meets the virtual vertical line, wherein a vertical component value of a point where the third vertical axis meets a virtual horizontal line may be the same as a vertical component value of a point where at least one of the first vertical axis or the second vertical axis meets the virtual horizontal line.

According to various embodiments, the identifying of whether the first screen and the second screen are available may include identifying whether an user interface included in an application is displayed on the first screen and the second screen, wherein the determining of whether the identifying result satisfies the predefined condition may include determining that the predefined condition is satisfied when the user interface is displayed on the first screen and the second screen.

According to various embodiments, the identifying of whether the first screen and the second screen are available may include determining a folded or unfolded state between first and second housings, based on sensing information acquired via a sensor module, wherein the first and second housings are folded or unfolded with each other, wherein the first touch screen display is placed on the first housing and the second touch screen display is placed on the second housing, wherein the determining of whether the identifying result satisfies the predefined condition may include determining that the predefined condition is satisfied when the first housing and the second housing are unfolded with each other.

According to various embodiments, the sensor module may include a Hall sensor.

Figure 9:
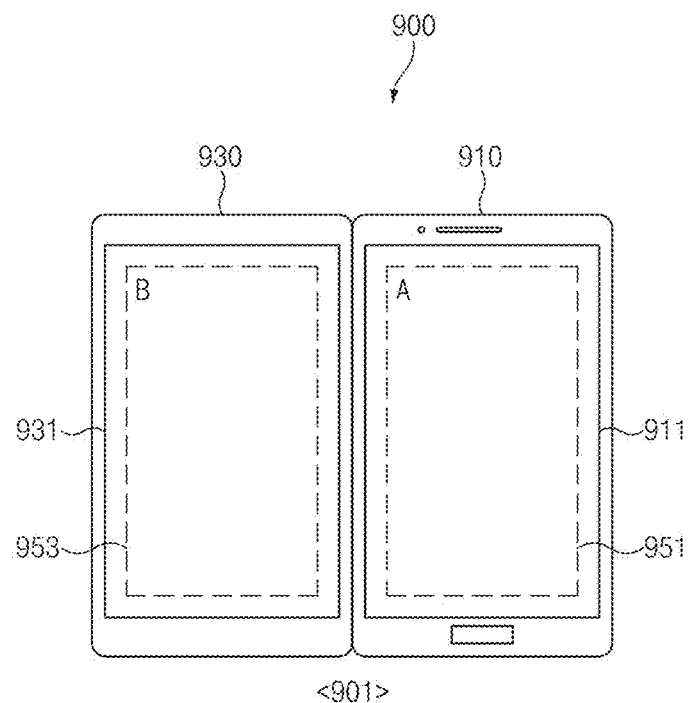
FIG. 9 is a diagram for illustrating an environment in which a plurality of touch screen displays act as a single touch screen display according to one embodiment.
Figure 9:
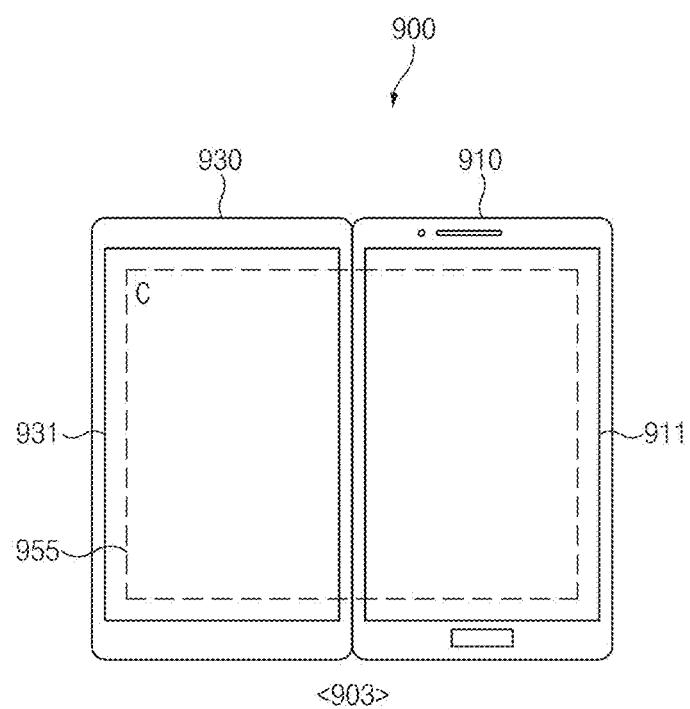

FIG. 9 is a diagram for illustrating an environment in which a plurality of touch screen displays act as a single touch screen display according to an embodiment.

Referring to FIG. 9, an electronic device 900 (e.g., the electronic device 100) may include a plurality of touch screen displays. For example, the electronic device 900 may include a first touch screen display 911 (e.g., the first display 110) and a second touch screen display 931 (e.g., the second display 130). According to one embodiment, the plurality of touch screen displays may be disposed in different housings, respectively. The different housings may be connected to each other to form an appearance of the electronic device 900. For example, the first touch screen display 911 may be disposed on a first housing 910 (e.g., the first housing 210), and the second touch screen display 931 may be disposed on a second housing 930 (e.g., the second housing 230).

According to one embodiment, the first housing 910 and the second housing 930 may pivot around one side thereof and thus may be unfolded and folded with each other. In one example, the first housing 910 and the second housing 930 may pivot around a region where they are connected to each other. In the illustrated FIG. 9, the first housing 910 and the second housing 930 may pivot around a left end of the first housing 910 and a right end of the second housing 930 respectively.

According to one embodiment, in a state in which the first housing 910 and the second housing 930 are unfolded with each other, the first touch screen display 911 may be exposed through a front surface of the first housing 910, and the second touch screen display 931 may be exposed through a front surface of the second housing 930, when viewed from a front surface of the electronic device 900. Further, when the first housing 910 and the second housing 930 are folded with each other, the front surface of the first housing 910 and the front surface of the second housing 930 contact each other. Thus, the first touch screen display 911 exposed through the front surface of the first housing 910 and the second touch screen display 931 exposed through the front surface of the second housing 930 contact each other and thus are not exposed to the outside.

According to one embodiment, in a state in which the first touch screen display 911 and the second touch screen display 931 are unfolded with each other (e.g., when the first housing 910 and the second housing (930) are unfolded with each other), the electronic device 900 may operate screens of a plurality of touch screen displays as separate screens, or as one integrated screen. In one example, in a first state 901, the electronic device 900 may output an execution screen 951 of a first application (e.g., "A" application) through the first touch screen display 911, and may output an execution screen 953 of a second application (e.g., "B" application) through the second touch screen display 931. In another example, in a second state 903, the electronic device 900 may display an execution screen 955 of a third application (e.g., "C" application) on the first touch screen display 911 and the second touch screen display 931. That is, the electronic device 900 may display a partial region of the execution screen 955 of the third application on the first touch screen display 911, and a region other than the partial region of the execution screen 955 of the third application on the second touch screen display 931.

Figure 10:
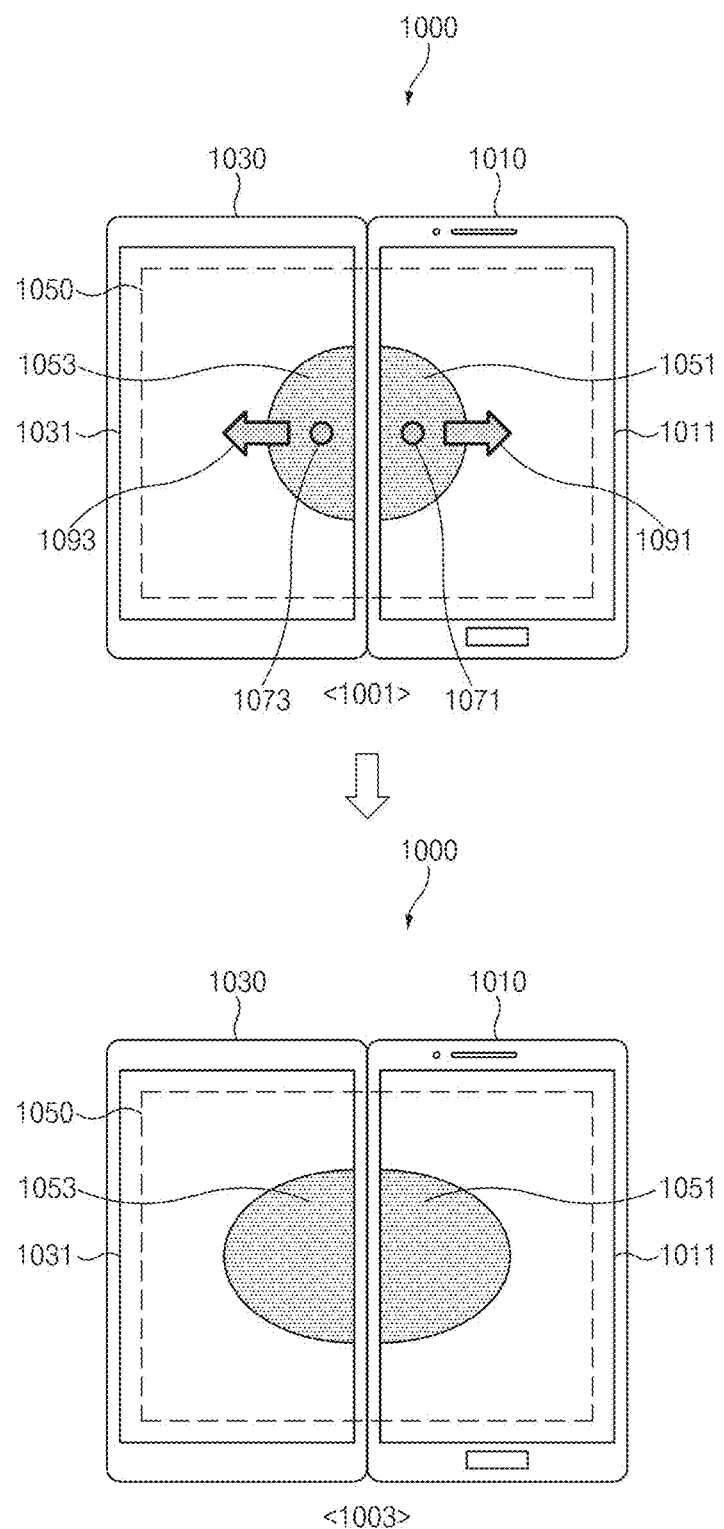
FIG. 10 is a diagram for illustrating a method of processing a plurality of touch inputs to different touch screen displays as the plurality of touch inputs to a single touch screen display according to an embodiment.

FIG. 10 is a diagram for illustrating a method of processing a plurality of touch inputs to different touch screen displays as a plurality of touch inputs to a single touch screen display according to an embodiment.

Referring to FIG. 10, an electronic device 1000 (e.g., the electronic device 100) may include a first housing 1010 (e.g., the first housing 210) and a second housing 1030 (e.g., the second housing 230). The first housing 1010 and the second housing 1030 may be connected to each other at one side thereof and may pivot around one side where they are connected to each other. For example, the second housing 1030 may pivot toward the first housing 1010 to cover at least one surface of the first housing 1010. Likewise, the first housing 1010 may pivot toward the second housing 1030 to cover at least one surface of the second housing 1030. A first touch screen display 1011 (e.g., the first display 110) may be mounted on the first housing 1010, and a second touch screen display 1031 (e.g., the second display 130) may be mounted on the second housing 1030.

According to one embodiment, while the first housing 1010 and the second housing 1030 are in an unfolded state, that is, the first touch screen display 1011 seated on the first housing 1010 and the second touch screen display 1031 seated on the second housing 1030 are exposed to the outside, the electronic device 1000 may operate the first touch screen display 1011 and the second touch screen display 1031 as an integrated single touch screen display. In one example, the electronic device 1000 may output an execution screen 1050 of one application through the first touch screen display 1011 and the second touch screen display 1031. For example, the electronic device 1000 may display a partial region of the execution screen 1050 of the application on the first touch screen display 1011, and a region other than the partial region of the execution screen 1050 of the application on the second touch screen display 1031. In this case, in a first state 1001, a portion 1051 of an object included in the execution screen 1050 of the application may be displayed on the first touch screen display 1011, and a remaining portion 1053 may be displayed on the second touch screen display 1031.

According to an embodiment, when the electronic device 1000 operates the first touch screen display 1011 and the second touch screen display 1031 as an integrated single touch screen display, the electronic device 1000 may process a first touch input 1071 to the first touch screen display 1011 and a second touch input 1073 to the second touch screen display 1031 as a combination of a plurality of touch inputs rather than separate touch inputs. For example, in a first state 1001, when the first touch input 1071 is a gesture input to one point of the first touch screen display 1011 and moving in a first direction 1091, and the second touch input 1073 is a gesture input to one point of the second touch screen display 1031 and moving in a second direction 1093 (e.g., an opposite direction to the first direction 1091), the electronic device 1000 may process the first touch input 1071 and the second touch input 1073 not as a first drag input to the first touch screen display 1011 and a second drag input to the second touch screen display 1031, respectively, but as one multi-touch input.

In one example, when a movement direction (e.g., the first direction 1091) of the first touch input 1071 and a movement direction (e.g., the second direction 1093) of the second touch input 1073 are opposite to each other such that a spacing between the first touch input 1071 and the second touch input 1073 increases, the electronic device 1000 may process the first touch input 1071 and the second touch input 1073 as one pinch out gesture. For example, in a second state 1003, the electronic device 1000 may stretch the portion 1051 of the object output on the first touch screen display 1011 in the first direction 1091 and stretch the remaining portion 1053 of the object output on the second touch screen display 1031 in the second direction 1093. In another example, when the movement direction of the first touch input 1071 and the movement direction of the second touch input 1073 are opposite to each other such that a spacing between the first touch input 1071 and the second touch input 1073 decreases, the electronic device 1000 may process the first touch input 1071 and the second touch input 1073 as one pinch-in gesture.

Figure 11:
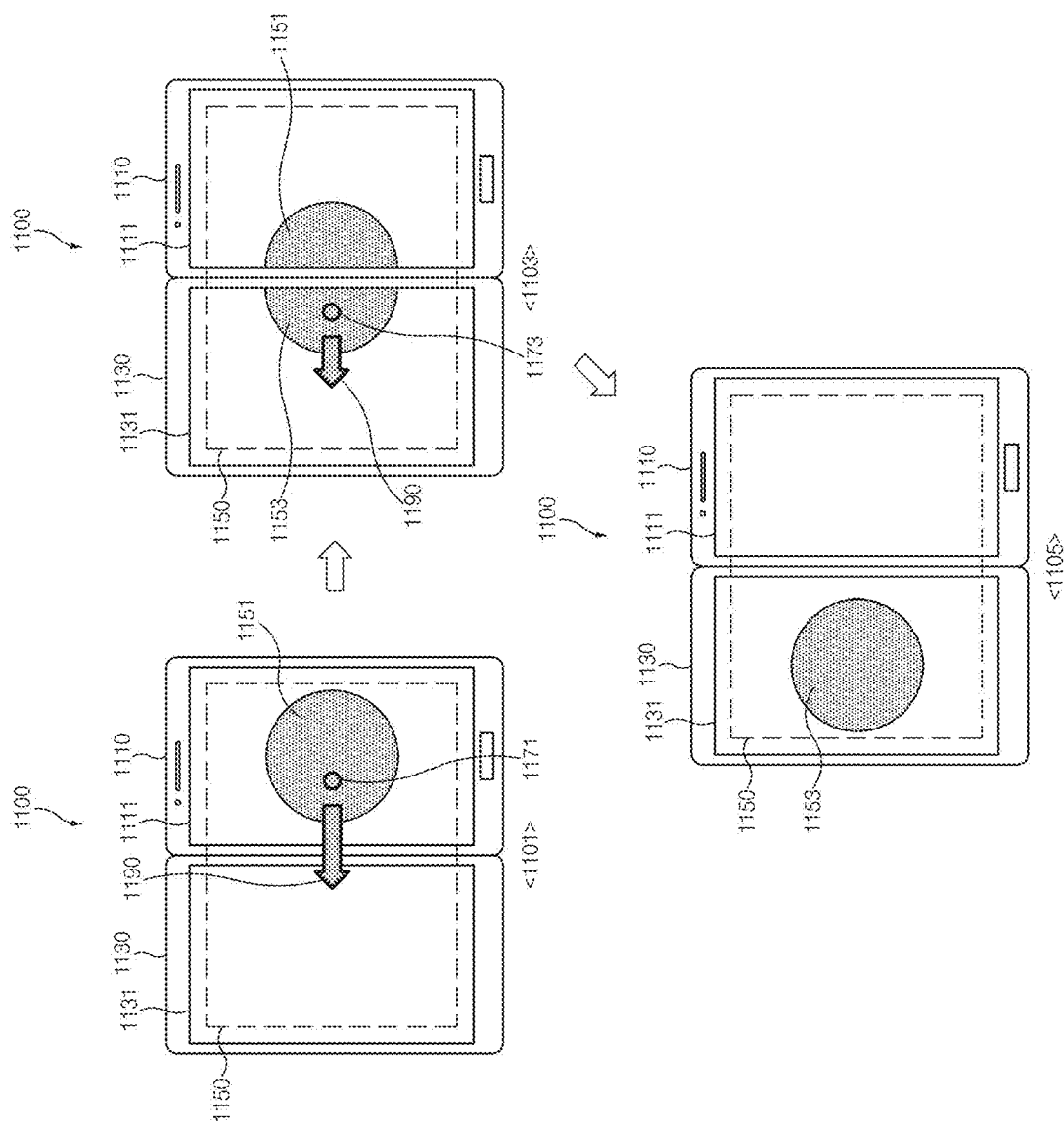
FIG. 11 is a diagram for illustrating another method of processing a plurality of touch inputs to different touch screen displays as the plurality of touch inputs to a single touch screen display according to an embodiment.

FIG. 11 is a diagram for illustrating another method of processing a plurality of touch inputs to different touch screen displays as a plurality of touch inputs to a single touch screen display according to an embodiment.

Referring to FIG. 11, an electronic device 1100 (e.g., the electronic device 100) includes a first housing 1110 (e.g., the first housing 210) and a second housing 1130 (e.g., the second housing 230). A first touch screen display 1111 (e.g., the first display 110) may be mounted on the first housing 1110, and a second touch screen display 1131 (e.g., the second display 130) may be mounted on the second housing 1130. The housings shown in FIG. 11 may have the same or similar structure and arrangement to the housings shown in FIG. 10. A folding or unfolding operation thereof and an operating method of the touch screen display based on the folded or unfolded state in FIG. 11 may be the same or similar to those in FIG. 10. In one example, when the first housing 1110 and the second housing 1130 are in an unfolded state, the electronic device 1100 may display a partial region of an execution screen 1150 of an application on the first touch screen display 1111 and a region other than the partial region of the execution screen 1150 of the application on the second touch screen display 1131.

According to one embodiment, when the electronic device 1100 operates the first touch screen display 1111 and the second touch screen display 1131 as an integrated single touch screen display, the electronic device 1100 may process a first touch input 1171 to the first touch screen display 1111 and a second touch input 1173 to the second touch screen display 1131 as a combination of a plurality of touch inputs instead of separate touch inputs. For example, in a first state 1101, the first touch input 1171 is a gesture input to one point of the first touch screen display 1111 and moving in one direction 1190 (e.g., toward the second touch screen display 1131, and then the first touch input 1171 is moved to a portion where the first touch screen display 1111 and the second touch screen display 1131 are connected to each other, and then the movement thereof ends at the portion. In a second state 1103, the second touch input 1173 is a gesture input to one point of the second touch screen display 1131 adjacent to the portion where the movement of the first touch input 1171 ends, and moving in one direction 1190. In this case, the electronic device 1100 may process the first touch input 1171 and the second touch input 1173 as a single combined gesture input. For example, the electronic device 1100 may process the first touch input 1171 and the second touch input 1173 as a single drag input moving to one direction 1190.

In this case, the electronic device 1100 may move a first object 1151 output on the first touch screen display 1111 in one direction 1190. When the first object 1151 is moved to the portion where the first touch screen display 1111 and the second touch screen display 1131 are connected to each other, the electronic device 1100 may gradually deactivate the outputting of a portion of the first object 1151 reaching the second touch screen display 1131 as in the second state 1103. The electronic device 1100 may output a second object 1153 through the second touch screen display 1131 by an amount corresponding to the deactivated portion of the first object 1151. Further, when the outputting of an entirety of the first object 1151 through the first touch screen display 1111 is terminated, the second object 1153 may be displayed on the second touch screen display 1131 in a shape corresponding to a full shape of the first object 1151 as in a third state 1105.

Figure 12:
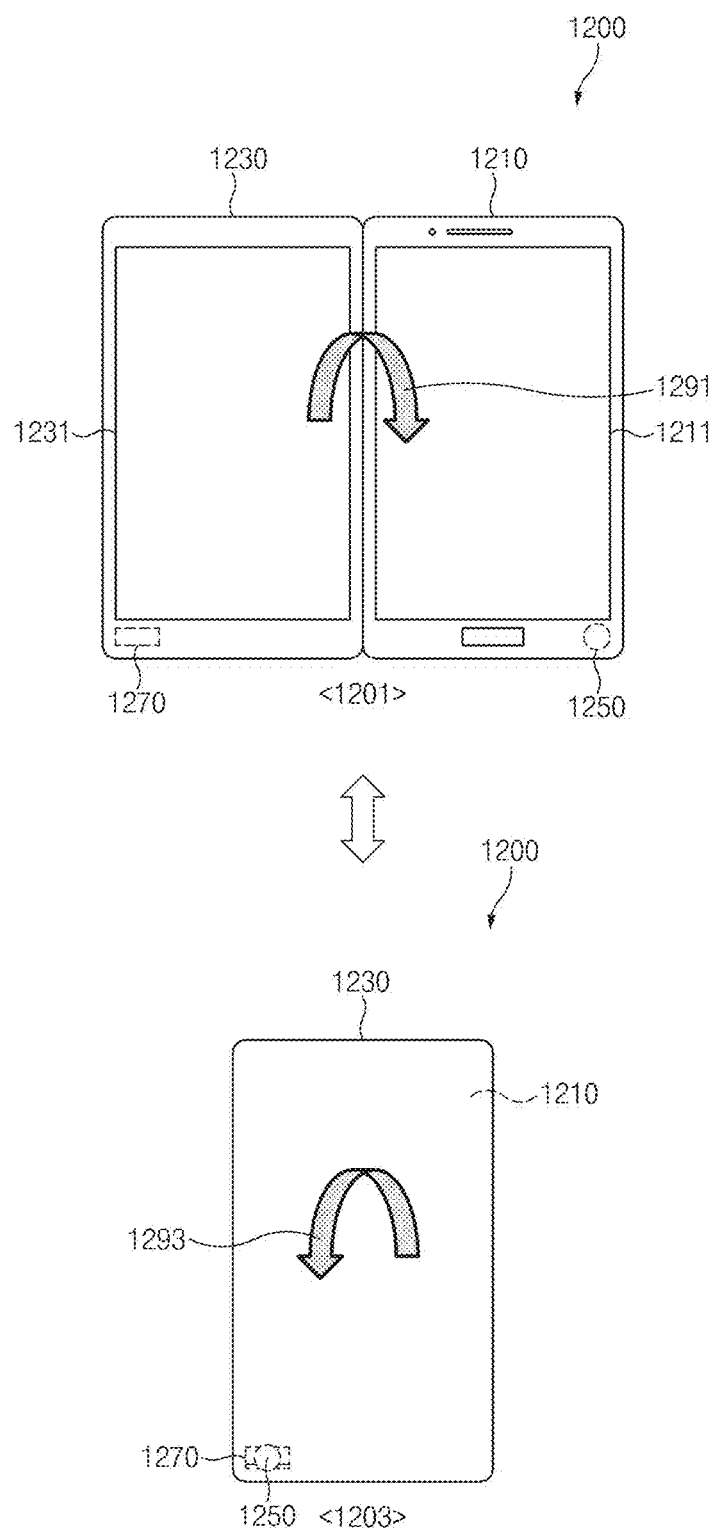
FIG. 12 is a diagram for illustrating a method for identifying a folded or unfolded state between a plurality of touch screen displays according to an embodiment.

FIG. 12 is a diagram for illustrating a method for identifying a folded or unfolded state between a plurality of touch screen displays according to an embodiment.

Referring to FIG. 12, an electronic device 1200 (e.g., the electronic device 100) includes a plurality of touch screen displays (e.g., a first touch screen display 1211 and a second touch screen display 1231) and a sensor that may identify the folded or unfolded state between the plurality of touch screen displays. In one example, in a first state 1201, a Hall sensor 1250 may be disposed inside an edge region of a first housing 1210 on which the first touch screen display 1211 is disposed. A magnet 1270 may be disposed inside an edge region of a second housing 1230 on which the second touch screen display 1231 is disposed.

The Hall sensor 1250 may detect a magnetic field generate by the magnet 1270 using the property that a voltage changes according to an intensity of the magnetic field. Accordingly, the edge region of the first housing 1210 where the Hall sensor 1250 is disposed and the edge region of the second housing 1230 where the magnet 1270 is disposed are closer to each other as the first housing 1210 and the second housing 1230 are folded with each other 1291. Thus, the Hall sensor 1250 may sense the magnetic field generated by the magnet 1270. That is, when the intensity of the magnetic field sensed by the Hall sensor 1250 increases, it may be determined that the first touch screen display 1211 disposed on the first housing 1210 and the second touch screen display 1231 disposed on the second housing 1230) are folded with each other. Further, in a second state 1203, when the first housing 1210 and the second housing 1230 are unfolded with each other 1293, the intensity of the magnetic field sensed by the Hall sensor 1250 decreases. Thus, it may be determined that the first touch screen display 1211 disposed on the first housing 1210 and the second touch screen display 1231 disposed on the second housing 1230 are unfolded with each other.

Figure 13:
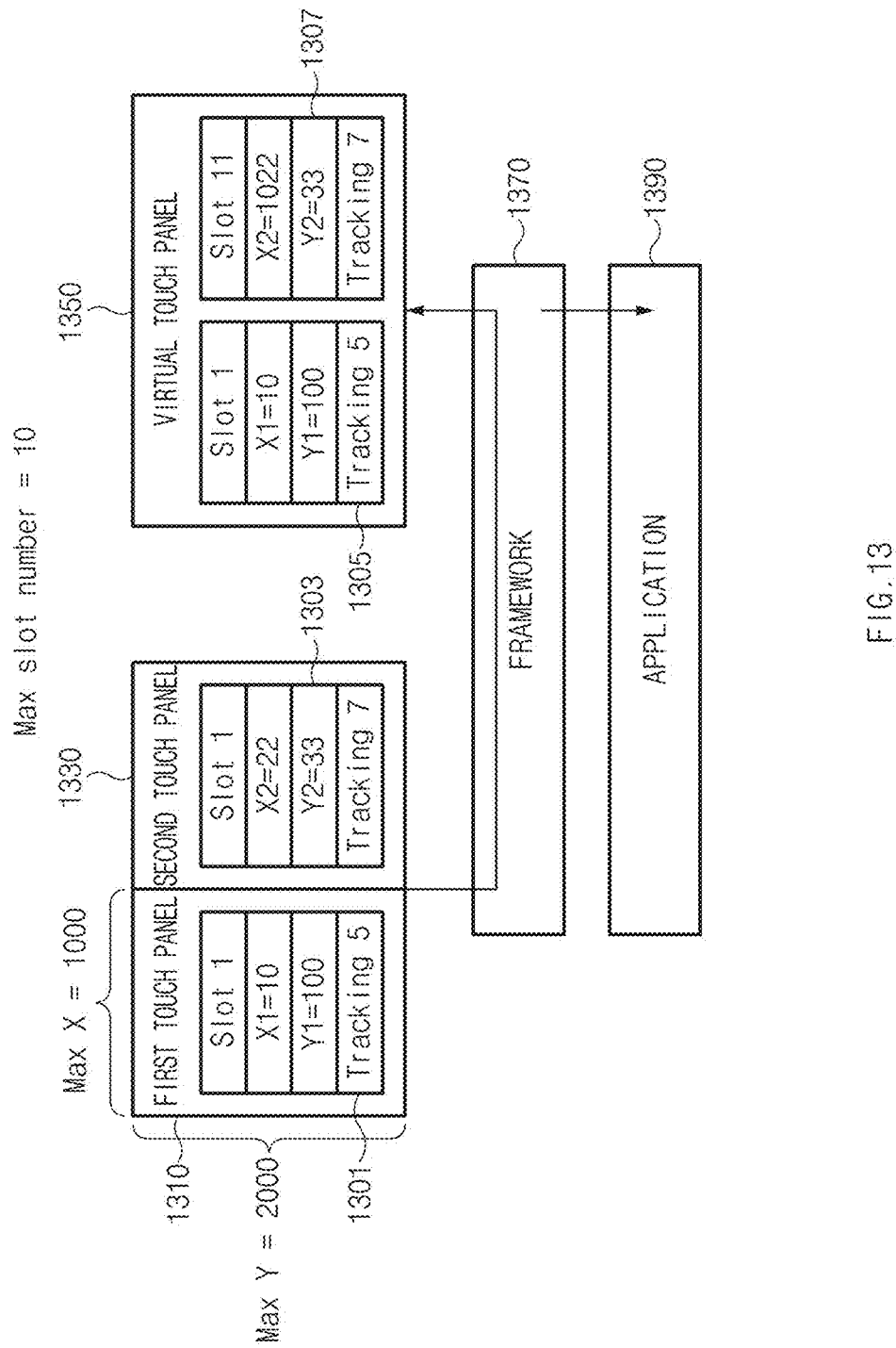
FIG. 13 is a diagram for illustrating a method of processing data related to touch inputs received from different touch panels as data related to touch inputs received from a single touch panel according to an embodiment.

FIG. 13 is a diagram for illustrating a method of processing data related to touch inputs received from different touch panels as data related to touch inputs received from a single touch panel according to an embodiment.

Referring to FIG. 13, an electronic device (e.g., the electronic device 100) may store first data 1301 corresponding to a first touch input received through a first touch panel 1310 into a first touch buffer. Further, the electronic device may store second data 1303 corresponding to a second touch input received through a second touch panel 1330 into a second touch buffer.

According to one embodiment, the electronic device may process the touch inputs to the first touch panel 1310 and the second touch panel 1330 as touch inputs to one virtual touch panel 1350. For example, the electronic device may process the first touch input to the first touch screen display and the second touch input to the second touch screen display not as separate touch inputs, but as a combination of a plurality of touch inputs to a virtual integrated touch screen display.

In one example, when the first touch panel 1310 has a first coordinate region defined using the first horizontal axis and the first vertical axis, and the second touch panel 1330 has a second coordinate region defined using the second horizontal axis and the second vertical axis, the virtual touch panel 1350 may have a virtual third coordinate region incorporating the first coordinate region and the second coordinate region. Further, the electronic device may convert the first data 1301 and the second data 1303 to first virtual data 1305 and second virtual data 1307, respectively, based on the third coordinate region.

According to one embodiment, when vertical component values of points where the first vertical axis and the second vertical axis meet the virtual horizontal line, respectively are the same as each other (e.g., when a lower end of the first touch panel and a lower end of the second touch panel coincide with each other in a vertical direction), the third vertical axis of the virtual third coordinate region may be set to the first vertical axis or the second vertical axis. In the illustrated drawing, a state in which the vertical axis of the virtual third coordinate region is set to the first vertical axis is shown. In this case, the electronic device may set the vertical component values of the first virtual data 1305 and the second virtual data 1307 to be the same as the vertical component values of the first data 1301 and the second data 1303, respectively. Further, the electronic device may set the horizontal component value of the first virtual data 1305 or the second virtual data 1307 based on the horizontal direction position relationship between the first touch panel 1310 and the second touch panel 1330. For example, as in the illustrated drawing, when the first touch panel 1310 is located on a left side of the second touch panel 1330, the electronic device may set a horizontal component value of the first virtual data 1305 to be the same as the horizontal component value of the first data 1301, and may set a horizontal component value of the second virtual data 1307 to a sum of a horizontal component value of the second data 1303 and a horizontal length (e.g., "Max X") of the first touch panel 1310.

According to an embodiment, data (e.g., the first data 1301 and the second data 1303) corresponding to touch inputs to the first touch panel 1310 and the second touch panel 1330 may be delivered to a framework 1370. The framework 1370 may identify that the received data are related to the first touch panel 1310 and the second touch panel 1330, and may process the data into the virtual data (e.g., the first virtual data 1305 and the second virtual data 1307). Further, the framework 1370 may transfer the virtual data to the virtual touch panel 1350. Further, the framework 1370 may deliver a touch event corresponding to the virtual data to an application 1390.

Figure 14:
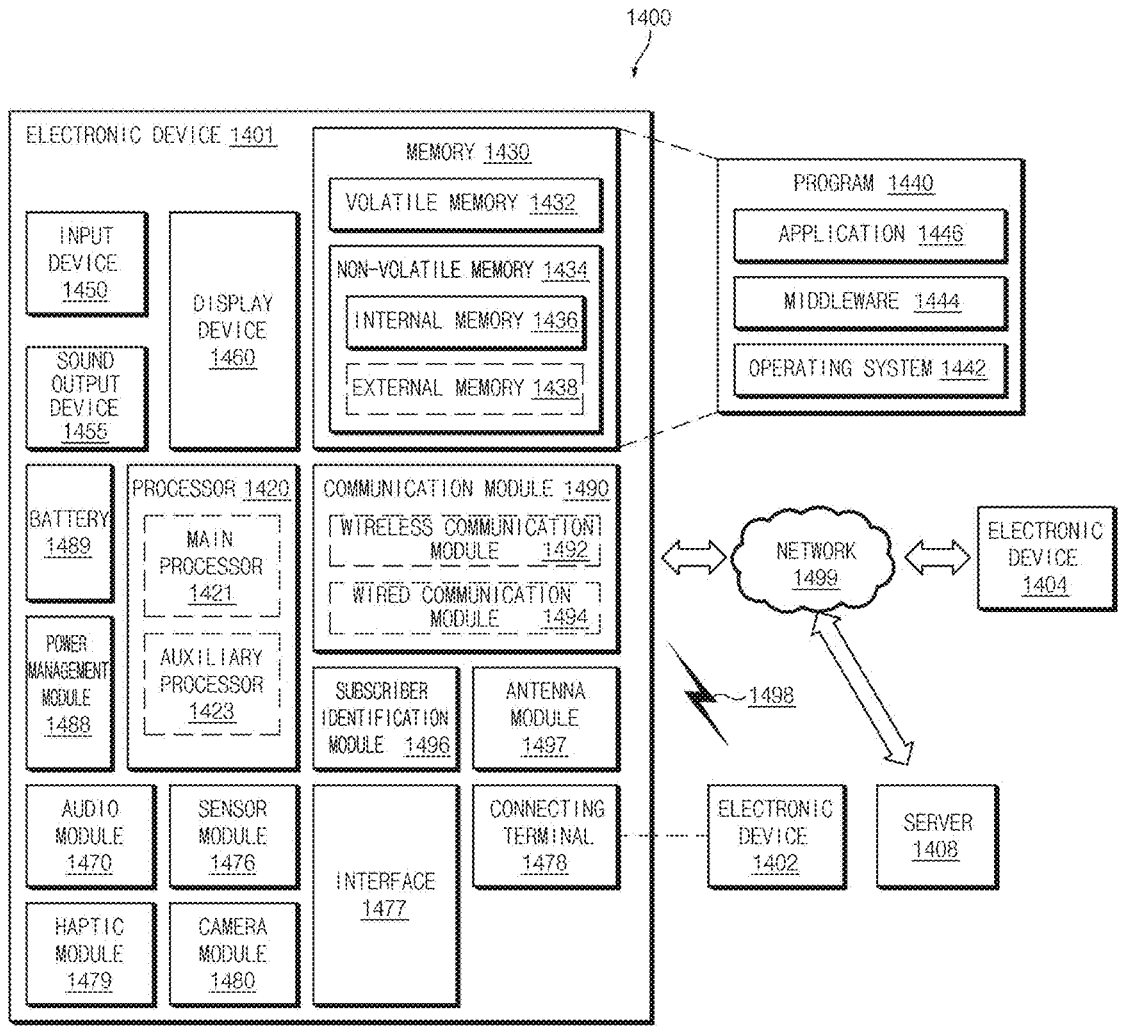
FIG. 14 is a block diagram of an electronic device in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector), The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising: a first touch screen display including a first touch panel having a first coordinate region defined using a first horizontal axis, a first vertical axis, and a first display panel for displaying a first screen based on a first display buffer corresponding to the first coordinate region; a second touch screen display including a second touch panel having a second coordinate region defined using a second horizontal axis, a second vertical axis, and a second display panel for displaying a second screen based on a second display buffer corresponding to the second coordinate region; a sensor configured to acquire sensor information for determining a physical state of a first housing on which the first touch screen display is placed and a second housing on which the second touch screen display is placed, the physical state including a folded state and an unfolded state; a processor operatively connected to the first touch screen display and the second touch screen display; and a memory operatively connected to the processor, wherein the memory stores therein instructions which, when executed by the processor, cause the processor to: determine whether the physical state satisfies a predefined condition; upon determining that the physical state satisfies the predefined condition, configure a virtual third coordinate region, wherein the virtual third coordinate region is defined using a third horizontal axis and a third vertical axis; create a third touch buffer corresponding to the virtual third coordinate region; receive first data from the first touch panel, wherein the first data is associated with a first touch input received through the first touch screen display, and is based on the first coordinate region, and store the first data corresponding to the first touch input into a first touch buffer corresponding to the first coordinate region; receive second data from the second touch panel, wherein the second data is associated with a second touch input received through the second touch screen display and is based on the second coordinate region, and store the second data corresponding to the second touch input into a second touch buffer corresponding to the second coordinate region; convert the first data and the second data to first virtual data and second virtual data using the virtual third coordinate region, respectively; store the first virtual data and the second virtual data in the third touch buffer; map the first display buffer and the second display buffer to the third touch buffer, based on the virtual third coordinate region; and apply an action corresponding to the first touch input and the second touch input to the first touch screen display and the second touch screen display, based on the first virtual data and the second virtual data, wherein when the first touch panel is positioned on a left side of the second touch panel, a horizontal component value of the first virtual data is set to be equal to a horizontal component value of the first data and a horizontal component value of the second virtual data is set to be equal to a sum of a horizontal component value of the second data and a horizontal length of the first touch panel, and wherein when the first touch panel is positioned on a right side of the second touch panel, the horizontal component value of the second virtual data is set to be equal to the horizontal component value of the second data and the horizontal component value of the first virtual data is set to be equal to a sum of the horizontal component value of the first data and a horizontal length of the second touch panel.

2. The electronic device of claim 1, wherein a horizontal component value of a point where the third horizontal axis meets a virtual vertical line is the same as a horizontal component value of a point where at least one of the first horizontal axis or the second horizontal axis meets the virtual vertical line, and wherein a vertical component value of a point where the third vertical axis meets a virtual horizontal line is the same as a vertical component value of a point where at least one of the first vertical axis or the second vertical axis meets the virtual horizontal line.

3. The electronic device of claim 2, wherein the horizontal component value of the point where the third horizontal axis meets the virtual vertical line is the same as the horizontal component value of the point where the first horizontal axis meets the virtual vertical line, and wherein the vertical component values of the points where the first vertical axis, the second vertical axis, and the third vertical axis meet the virtual horizontal line, respectively are the same as each other.

4. The electronic device of claim 2, wherein the vertical component value of the point where the third vertical axis meets the virtual horizontal line is the same as the vertical component value of the point where the first vertical axis meets the virtual horizontal line, and wherein the horizontal component values of the points where the first horizontal axis, the second horizontal axis, and the third horizontal axis meet the virtual vertical line, respectively are the same as each other.

5. The electronic device of claim 1, wherein the memory further stores therein an application including an user interface, and wherein the instructions cause the processor to:
display the user interface on the first touch screen display and the second touch screen display; and
change at least a portion of the user interface, based on the first virtual data and the second virtual data.

6. The electronic device of claim 1, wherein the first touch input and the second touch input are received substantially simultaneously.

7. The electronic device of claim 1, wherein the electronic device further comprises a Hall sensor, wherein the instructions cause the processor to configure the virtual third coordinate region in response to reception of a signal from the Hall sensor.

8. The electronic device of claim 1, wherein the second housing is foldable toward the first housing to cover at least one surface of the first housing.

9. The electronic device of claim 1, wherein the second housing is foldable toward the first housing to cover at least one surface of the first housing.

10. A method for processing a touch input in an electronic device, the method comprising: acquiring sensor information for determining a physical state of a first housing on which a first touch screen display is placed and a second housing on which a second touch screen display is placed, the physical state including a folded state and an unfolded state; determining whether the physical state satisfies a predefined condition; upon determination that the physical state satisfies the predefined condition, configuring a virtual third coordinate region, wherein the virtual third coordinate region is defined using a third horizontal axis and a third vertical axis, based on the first coordinate region and the second coordinate region; creating a third touch buffer corresponding to the virtual third coordinate region; receiving a first touch input onto a first screen displayed on a first display panel through a first touch panel, based on a first display buffer corresponding to a first coordinate region defined using a first horizontal axis and a first vertical axis; storing first data corresponding to the first touch input into a first touch buffer corresponding to the first coordinate region; receiving a second touch input onto a second screen displayed on a second display panel through a second touch panel, based on a second display buffer corresponding to a second coordinate region defined using a second horizontal axis and a second vertical axis; storing second data corresponding to the second touch input into a second touch buffer corresponding to the second coordinate region; converting the first data and the second data to first virtual data and second virtual data using the virtual third coordinate region, respectively; storing the first virtual data and the second virtual data into the third touch buffer; mapping the first display buffer and the second display buffer to the third touch buffer, based on the virtual third coordinate region; and applying an action corresponding to the first touch input and the second touch input to a first touch screen display and a second touch screen display, based on the first virtual data and the second virtual data, wherein the first touch screen display includes the first display panel and the first touch panel, and the second touch screen display includes the second display panel and the second touch panel, wherein when the first touch panel is positioned on a left side of the second touch panel, a horizontal component value of the first virtual data is set to be equal to a horizontal component value of the first data and a horizontal component value of the second virtual data is set to be equal to a sum of a horizontal component value of the second data and a horizontal length of the first touch panel, and wherein when the first touch panel is positioned on a right side of the second touch panel, the horizontal component value of the second virtual data is set to be equal to the horizontal component value of the second data and the horizontal component value of the first virtual data is set to be equal to a sum of the horizontal component value of the first data and a horizontal length of the second touch panel.

11. The method of claim 10, wherein a horizontal component value of a point where the third horizontal axis meets a virtual vertical line is the same as a horizontal component value of a point where at least one of the first horizontal axis or the second horizontal axis meets the virtual vertical line, and wherein a vertical component value of a point where the third vertical axis meets a virtual horizontal line is the same as a vertical component value of a point where at least one of the first vertical axis or the second vertical axis meets the virtual horizontal line.

12. The method of claim 10, wherein identifying whether the first screen and the second screen are available includes identifying whether a user interface included in an application is displayed on the first screen and the second screen, and wherein determining whether an identifying result satisfies the predefined condition includes determining that the predefined condition is satisfied when the user interface is displayed on the first screen and the second screen.

13. The method of claim 10, wherein identifying whether the first screen and the second screen are available includes determining the folded or unfolded state between the first and second housings, based on the sensing information acquired via a sensor module, wherein the first and second housings are folded or unfolded with each other, and wherein determining whether an identifying result satisfies the predefined condition includes determining that the predefined condition is satisfied when the first housing and the second housing are unfolded with each other.

14. The method of claim 13, wherein the sensor module includes a Hall sensor.

* * * * *